(12) United States Patent
Utsugi et al.

(10) Patent No.: US 11,428,939 B2
(45) Date of Patent: Aug. 30, 2022

(54) LIGHT-GUIDING PLATE, LIGHT-GUIDING PLATE MANUFACTURING METHOD, AND VIDEO DISPLAY DEVICE

(71) Applicant: Hitachi-LG Data Storage, Inc., Tokyo (JP)

(72) Inventors: Takeru Utsugi, Tokyo (JP); Ryuji Ukai, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 178 days.

(21) Appl. No.: 16/759,376

(22) PCT Filed: Nov. 22, 2018

(86) PCT No.: PCT/JP2018/043205
§ 371 (c)(1),
(2) Date: Apr. 27, 2020

(87) PCT Pub. No.: WO2019/187332
PCT Pub. Date: Oct. 3, 2019

(65) Prior Publication Data
US 2020/0278546 A1    Sep. 3, 2020

(30) Foreign Application Priority Data
Mar. 27, 2018  (JP) .............................. JP2018-059448

(51) Int. Cl.
*G02B 27/01* (2006.01)
*G02B 5/32* (2006.01)
(Continued)

(52) U.S. Cl.
CPC .......... *G02B 27/0172* (2013.01); *G02B 5/32* (2013.01); *G02B 6/005* (2013.01); *G02B 6/0026* (2013.01);
(Continued)

(58) Field of Classification Search
CPC ........ G02B 5/32; G02B 6/0026; G02B 6/005; G02B 6/0065; G02B 2027/0123; G02B 2027/0174; G03H 1/0248; G03H 1/265
(Continued)

(56) References Cited

U.S. PATENT DOCUMENTS

| 2006/0132914 | A1 | 6/2006 | Weiss et al. |
| 2006/0228073 | A1 | 10/2006 | Mukawa et al. |
| 2017/0059759 | A1* | 3/2017 | Ayres .................. G03H 1/0248 |

FOREIGN PATENT DOCUMENTS

| JP | 2017-090561 A | | 5/2017 |
| JP | 2017090561 A | * | 5/2017 |

(Continued)

OTHER PUBLICATIONS

International Search Report of PCT/JP2018/04320 dated Dec. 18, 2018.
(Continued)

*Primary Examiner* — Collin X Beatty
(74) *Attorney, Agent, or Firm* — Mattingly & Malur, PC

(57) ABSTRACT

The present invention provides a light-guiding plate which is applicable to incident rays over a wide ray angular range and wide wavelength rage, and is able to suppress a decrease in optical efficiency. A light-guiding plate 200 having a light diffracting portion 1200 for diffracting incident light by a multiple-recorded hologram is configured such that, in the light diffracting portion, when light 1210 of a single wavelength having a certain angular range is incident, at least two or more outgoing rays 1220 are discretely emitted with a first angular space θs, and the emitted rays each have a second angular range θa, and the first angular space θs is equal to or larger than the second angular range θa.

13 Claims, 23 Drawing Sheets

(51) Int. Cl.
*F21V 8/00* (2006.01)
*G03H 1/02* (2006.01)
*G03H 1/26* (2006.01)

(52) U.S. Cl.
CPC ......... *G02B 6/0065* (2013.01); *G03H 1/0248* (2013.01); *G03H 1/265* (2013.01); *G02B 2027/0123* (2013.01); *G02B 2027/0174* (2013.01)

(58) Field of Classification Search
USPC .......................................................... 359/13
See application file for complete search history.

(56) References Cited

FOREIGN PATENT DOCUMENTS

| JP | 2017-135605 A | | 8/2017 | |
|---|---|---|---|---|
| JP | 2017135605 A | * | 8/2017 | |
| WO | 2005/093493 A1 | | 10/2005 | |
| WO | WO-2005093493 A1 | * | 10/2005 | ........... G02B 5/1842 |
| WO | 2017/176389 A1 | | 10/2017 | |

OTHER PUBLICATIONS

Japanese Office Action received in corresponding Japanese Application No. 2018-059448 dated May 18, 2021.

* cited by examiner

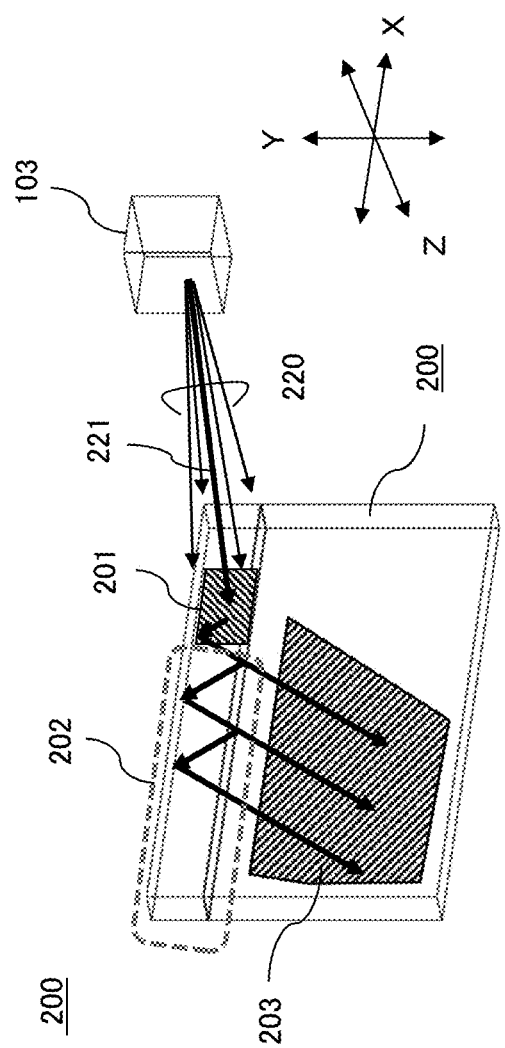

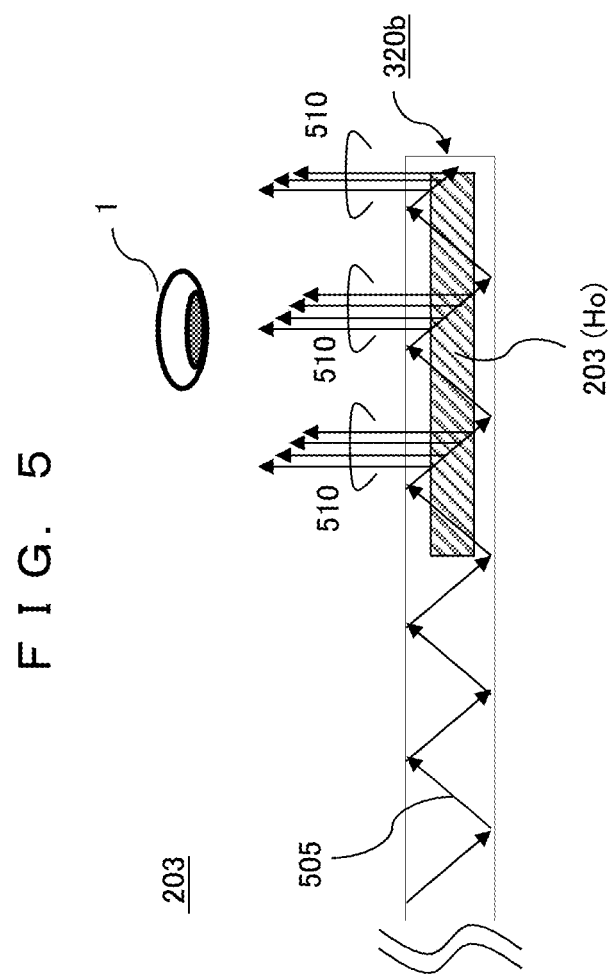

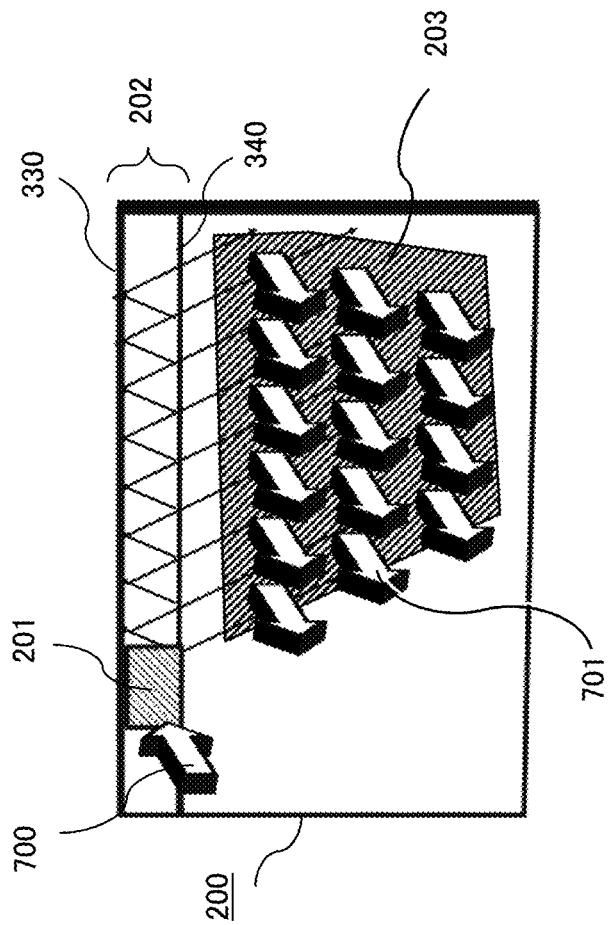

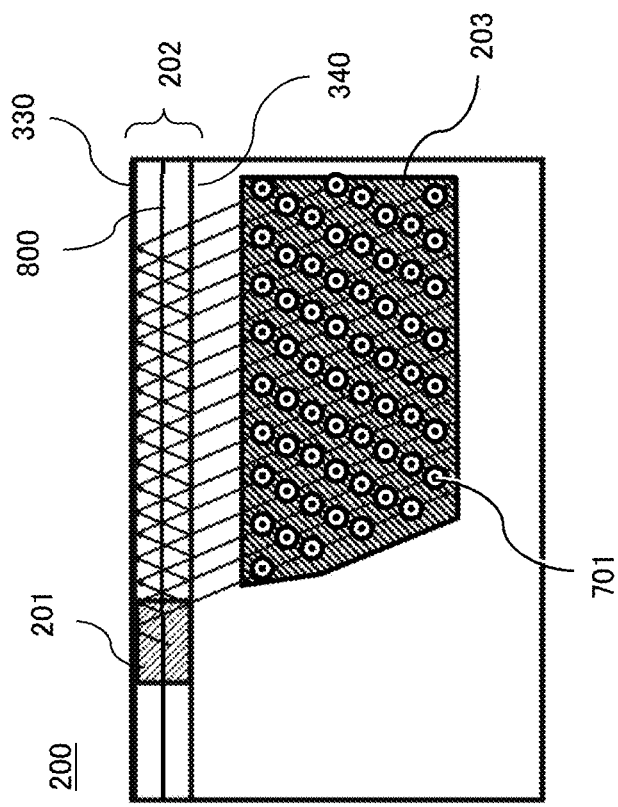
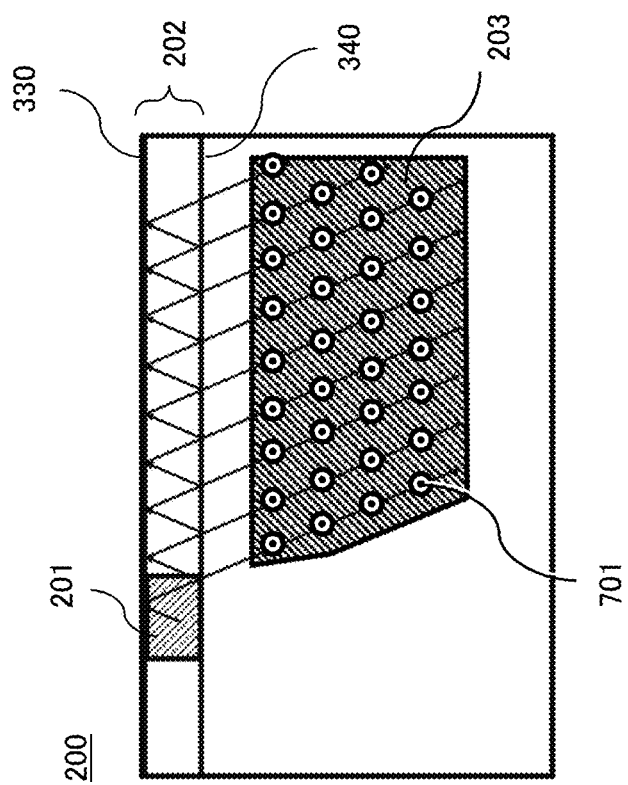
FIG. 8A
FIG. 8B

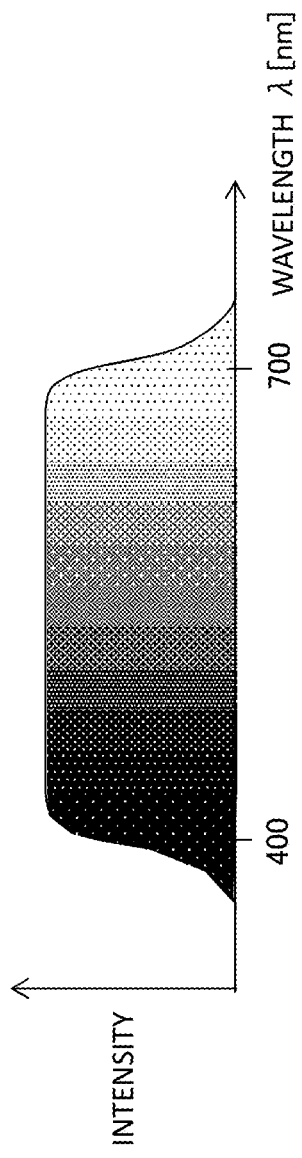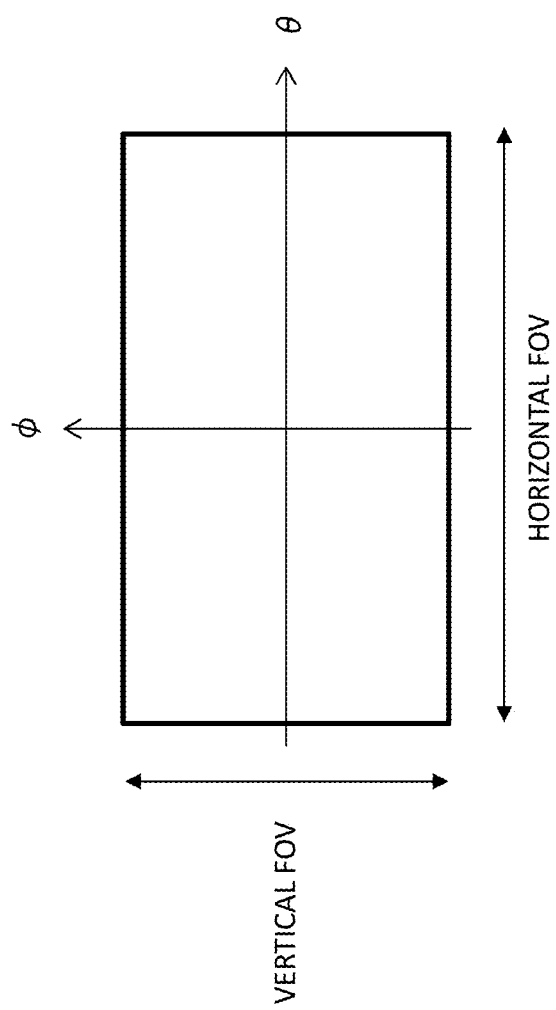

FIG. 10B

|  | SINGLE WAVELENGTH INCIDENCE (PLURALITY OF RAYS) | BROADBAND WAVELENGTH INCIDENCE (PLURALITY OF RAYS) |
|---|---|---|
| SINGLE HOLOGRAM | (a) $H_{N,1}^1 = \dfrac{p_1}{NP_{in}} = \dfrac{(M/\#)^2}{N}$ | (c) $H_{N,1}^w = \dfrac{p_1 \alpha w}{NP_{in}w} = \dfrac{\alpha(M/\#)^2}{N}$ |
| MULTIPLE HOLOGRAMS | (b) $H_{N,M}^1 = \dfrac{Mp_M}{NP_{in}} = \dfrac{(M/\#)^2}{NM}$ | (d) $H_{N,1}^w = \dfrac{Mp_M \alpha w}{NP_{in}w} = \alpha\dfrac{(M/\#)^2}{NM}$ |

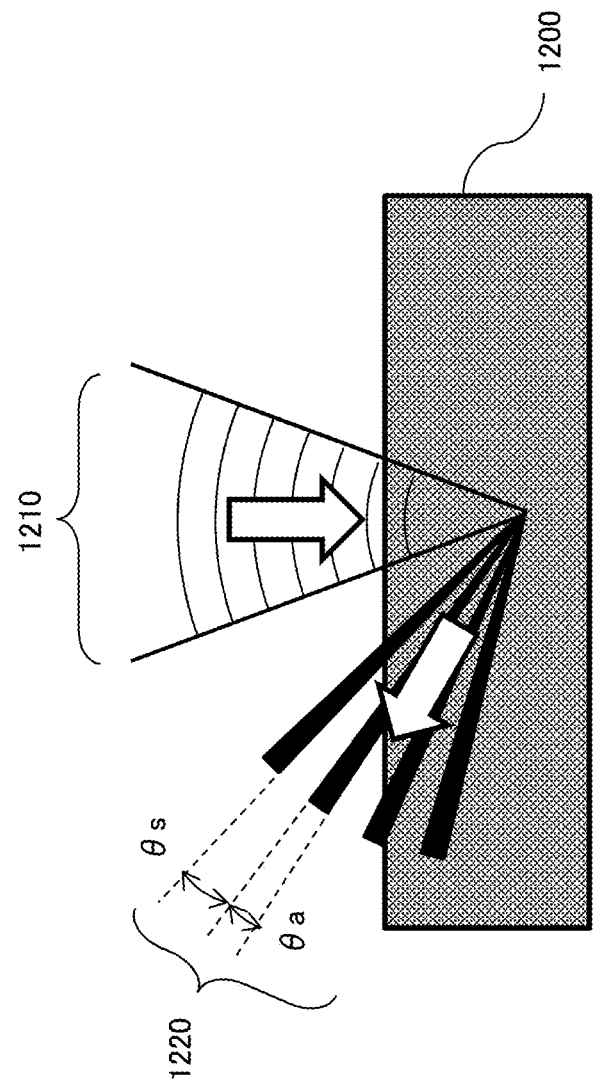

| RECORDING # | PRISM REFRACTIVE ANGLE θ1 [deg] | PRISM INCIDENT ANGLE θ2 [deg] | MIRROR ROTATION ANGLE [deg] |
|---|---|---|---|
| 1 | -13.0 | -19.7 | -9.86 |
| 2 | -12.0 | -18.2 | -9.09 |
| 3 | -11.0 | -16.6 | -8.32 |
| 4 | -10.0 | -15.1 | -7.55 |
| 5 | -9.0 | -13.6 | -6.79 |
| 6 | -8.0 | -12.0 | -6.02 |
| 7 | -7.0 | -10.5 | -5.27 |
| 8 | -6.0 | -9.0 | -4.51 |
| 9 | -5.0 | -7.5 | -3.76 |
| 10 | -4.0 | -6.0 | -3.00 |
| 11 | -3.0 | -4.5 | -2.25 |
| 12 | -2.0 | -3.0 | -1.50 |
| 13 | -1.0 | -1.5 | -0.75 |
| 14 | 0.0 | 0.0 | 0.00 |
| 15 | 1.0 | 1.5 | 0.75 |
| 16 | 2.0 | 3.0 | 1.50 |
| 17 | 3.0 | 4.5 | 2.25 |
| 18 | 4.0 | 6.0 | 3.00 |
| 19 | 5.0 | 7.5 | 3.76 |
| 20 | 6.0 | 9.0 | 4.51 |
| 21 | 7.0 | 10.5 | 5.27 |
| 22 | 8.0 | 12.0 | 6.02 |
| 23 | 9.0 | 13.6 | 6.79 |
| 24 | 10.0 | 15.1 | 7.55 |
| 25 | 11.0 | 16.6 | 8.32 |
| 26 | 12.0 | 18.2 | 9.09 |
| 27 | 13.0 | 19.7 | 9.86 |

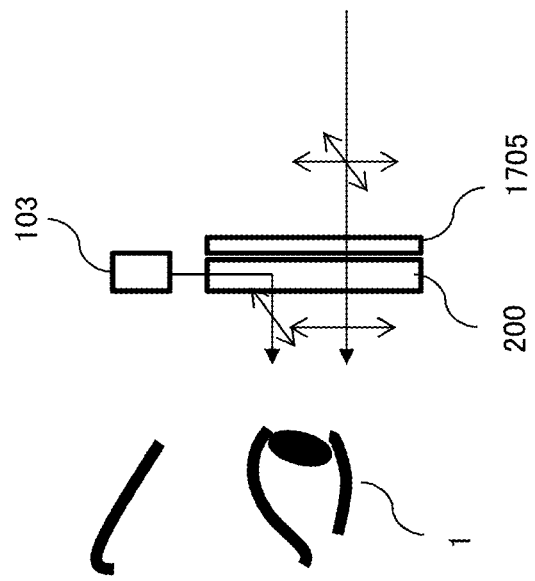

LIGHT-GUIDING PLATE, LIGHT-GUIDING PLATE MANUFACTURING METHOD, AND VIDEO DISPLAY DEVICE

TECHNICAL FIELD

The present invention relates to a light-guiding plate used for a video display device such as a head mounted display.

BACKGROUND ART

In a video display device such as a head mounted display (HMD), a light-guiding plate is used as an optical system for propagating image light emitted from a projector (image projection unit) to eyes of a user. It is desirable that the light-guiding plate used for the HMD is of a thin type and has high transmittance of light (external light transmittance) of the outside world. Although a half mirror can be used as the light-guiding plate, it is difficult to reduce the thickness in order to secure a wide field of view, and there is a trade-off relationship between the external light transmittance and the efficiency of display image light. For this reason, in the light-guiding plate using the half mirror, it has been difficult to reduce the thickness and to improve the external light transmittance.

Patent Document 1 and Patent Document 2 disclose that a special mirror (referred to as a "skew mirror" in the documents) in which the reflection axis is inclined with respect to the surface normal line by using a hologram technique can be realized. If a skew mirror is employed for the light-guiding plate, the same function as a mirror inclined with respect to the surface of the light-guiding plate is realized, which is effective in reducing the thickness of the light-guiding plate and improving the external light transmittance.

With respect to this, Patent Document 1 discloses that the skew mirror does not have a restriction that the reflection axis coincides with the surface normal line, reflects light to a certain reflection axis over a relatively wide wavelength range, and has a certain reflection axis over a wide range of incident angles. In addition, Patent Document 2 discloses that the skew mirror has a reflection axis, that is, a skew axis which is inclined with respect to the surface normal line, and the available field of view of the skew mirror can be enlarged, for example, to 60 degrees or more by inclining the two-dimensional skew axis with respect to the surface normal line.

CITATION LIST

Patent Document

Patent Document 1: US 2017/0059759 A1
Patent Document 2: WO 2017/176389 A

SUMMARY OF THE INVENTION

Problems to be Solved by the Invention

Since a hologram having a light diffracting function is thin and has characteristics such as wavelength selectivity and angle selectivity, light can be selectively diffracted, and thus, there is a possibility that image displaying can be performed with high efficiency while maintaining a high external light transmittance by employing the hologram to a light-guiding plate of an HMD. However, for the adaptation to the practical use conditions of the HMD, a more detailed examination of the configuration of the light-guiding plate is required.

With regard to skew mirrors described in Patent Documents 1 and 2, the performance as an incident/outgoing coupler will be examined. In a case where a ray having a wavelength $\lambda_1$ is incident on the surface of the light-guiding plate at an incident angle $\theta_1$, a portion of the ray is reflected by a skew mirror surface having inclination of a certain angle $\theta_g$ from the surface of the light-guiding plate. Herein, when the ray propagating in the light-guiding plate at an incident angle $\theta_1$ equal to or larger than the total reflection angle $\theta_{TIR}$ (TIR: Total Internal Reflection) is allowed to be incident on the skew mirror, a portion of the ray is reflected by the skew mirror surface, and a portion of the ray can be emitted to the outside of the light-guiding plate (outgoing coupler function). In addition, the ray is allowed to be incident from the outside of the light-guiding plate and to propagate in the light-guiding plate by total reflection (incident coupler function).

In the case of being used in a video display device such as an HMD, the ray group emitted from the projector has a wide ray angular range of about several tens degrees, which corresponds to a field of view (FOV). In addition, since a color image is displayed, the ray group has a wide wavelength range corresponding to three colors of RGB. Therefore, a practical skew mirror needs to be able to reflect a ray having "the incident angle $\theta_1$ in a wide angular range of several tens degrees and the wavelength $\lambda_1$ in a wide wavelength range of RGB".

However, the skew mirror is configured with a set of multiple-recorded volume-type holograms, and a general volume-type hologram has a narrow angle selectivity of several milli-degrees and a narrow wavelength selectivity of several nanometers. Therefore, in order to create a practical skew mirror that reflects a ray group having the above-mentioned required condition "a wide angle of several tens degrees and a wide wavelength of RGB", the number of multiple-recordings needs to be increased. For example, in Patent Document 2, multiple-recording is performed such that the number of hologram multiple-recordings is 200 or more and the recording angular space is about 0.2 degrees.

On the other hand, there is a property that, when the number of hologram multiple-recordings is increased, the diffraction efficiency of each hologram is decreased. The number of volume-type hologram multiple-recordings is generally evaluated by an index called an M number (M/#) of the recording medium of the hologram. The M/# is a finite value specific to the recording medium, and this limits the number of multiple-recordings and the diffraction efficiency of each hologram. For example, in the case of a recording medium having M/#=3, the diffraction efficiency of one hologram can be set to 100% when triple multiple-recordings are used. However, when ten multiple-recordings are used, the diffraction efficiency of one hologram is decreased to 9%. Herein, comparing the two cases, the former reproduces three holograms having a diffraction efficiency of 100%, and the latter reproduces ten holograms having a diffraction efficiency of 9%. Therefore, if the optical efficiency is diffraction efficiency×number of holograms, the former is higher. Thus, there is a property that, as the number of multiple-recordings is increased, the net diffraction efficiency (optical efficiency) is decreased.

For this reason, if a large number of multiple-recordings such as 200 multiple-recordings are performed in order to create a practical skew mirror, it is inevitable that the diffraction efficiency of the hologram will be significantly decreased. If the diffraction efficiency of the hologram is decreased, the optical efficiency of the skew mirror and, consequently, the light-guiding plate is decreased. If the optical efficiency is low, the image to be displayed becomes dark, and thus, for example, in a case where an augmented reality (AR) in which an image superimposed on the outside world, which is one of HMD applications, is allowed to be seen by a user is executed, reality feeling is reduced. In order to compensate for this, it is necessary to increase the output light amount of the projector that emits the image, and thus, there are problems of an increase in power consumption of the HMD, heat generation, an increase in size, and the like.

Furthermore, when the number of hologram multiple-recordings is large, the difficulty of manufacturing the skew mirror, and furthermore, the light-guiding plate is increased, and thus, there is a problem of increasing the number of manufacturing processes and increasing the cost.

The present invention has been made in consideration of such problems, and an object of the present invention is to provide a light-guiding plate which is applicable to incident rays in a wide ray angular range and a wide wavelength range and which can suppress a decrease in optical efficiency.

Solutions to Problems

The present invention provides a light-guiding plate having a light diffracting portion diffracting incident light by a multiple-recorded hologram, in which, in the light diffracting portion, when light of a single wavelength having a certain angular range is incident, at least two or more outgoing rays are discretely emitted with a first angular space θs, and the emitted rays each have a second angular range θa, and the first angular space θs is equal to or larger than the second angular range θa.

Effects of the Invention

According to the present invention, in the light-guiding plate which has the light diffracting portion, the light-guiding plate can be applied to the incident rays in a wide ray angular range and a wide wavelength range and can suppress a decrease in optical efficiency as much as possible.

BRIEF DESCRIPTION OF THE DRAWINGS

FIG. 3A is a schematic view illustrating the entire configuration of a light-guiding plate 200.

FIG. 5 is a schematic view illustrating a configuration of an outgoing coupler 203.

FIG. 7 is a view describing the effect of the eye-box enlargement unit 202.

FIG. 8A is a view illustrating the density of outgoing rays emitted from an outgoing coupler 203.

FIG. 8B is a view illustrating the density of outgoing rays emitted from the outgoing coupler 203.

FIG. 9A is a view illustrating a wavelength spectrum distribution of rays incident from the image projection unit 103.

FIG. 9B is a view illustrating a field of view of an image visually recognized by a user on the image display unit 104.

FIG. 10B is a view illustrating comparison of optical efficiencies including incident light of a broadband wavelength.

FIG. 12B is a view describing characteristics of a volume-type hologram suitable for an incident coupler and an outgoing coupler.

FIG. 18 is a view illustrating a configuration of a light-guiding plate according to a third embodiment.

MODE FOR CARRYING OUT THE INVENTION

Hereinafter, embodiments of the present invention will be described with reference to the drawings. In the following embodiments, the case of a glasses-type head mounted display (HMD) as a video display device will be described.

First Embodiment

Configuration of Image Display Device

Figure 1B:
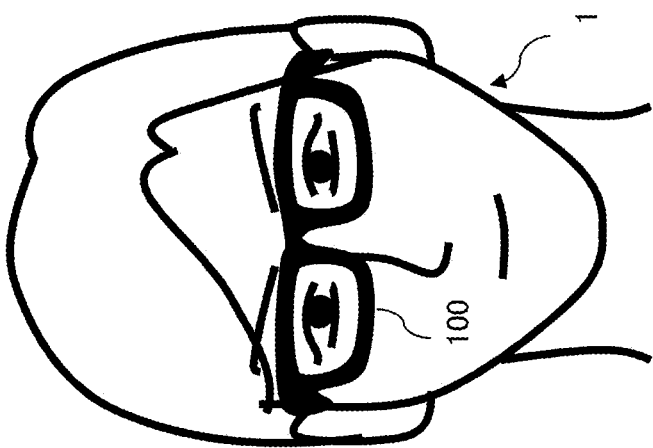
FIG. 1B is an external appearance view illustrating an example of use of the video display device 100.
Figure 1A:
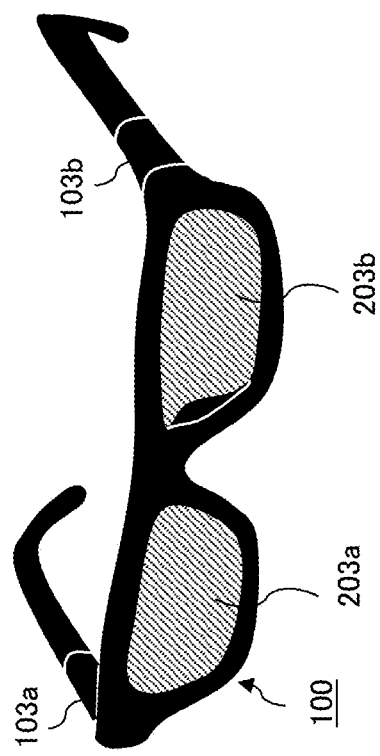
FIG. 1A is an external appearance view of a video display device 100 according to a first embodiment.

FIG. 1A is an external appearance view of a video display device 100 according to the present embodiment. In addition, FIG. 1B is an external appearance view illustrating an example of use of the video display device 100.

The glasses-type video display device (HMD) 100 includes an image projection unit 103*a* that projects an image displayed on the right eye of a user 1 and an image projection unit 103b that projects an image displayed on the left eye of the user 1 in a portion corresponding to the temple of glasses. In addition, the glasses-type video display device includes outgoing couplers 203a and 203b that transmit the images projected by the image projection units 103a and 103b to the eyes of the user 1 in portions corresponding to the lens of the glasses. The outgoing couplers 203a and 203b not only display an image but also allow light from the outside world to pass therethrough, and thus, can display an augmented reality (AR) for allowing the image to be seen by the user by superimposing and displaying the image on the outside world. The user 1 can view the image with both eyes by mounting the video display device 100 on the head.

Figure 2:
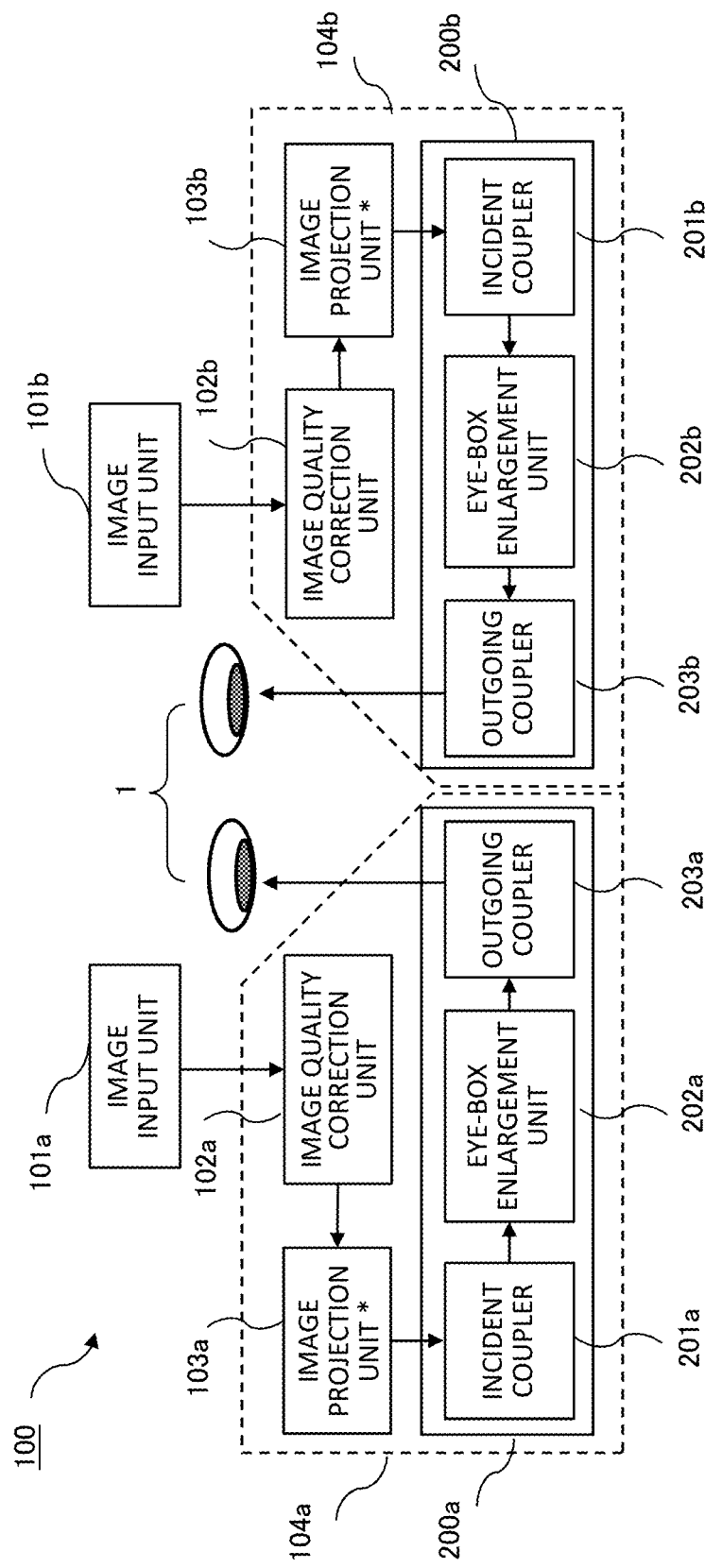
FIG. 2 is a view illustrating a block configuration of the video display device 100.

FIG. 2 is a view illustrating a block configuration of the video display device 100. The video display device 100 includes a right-eye image display unit 104a that displays an image on the right eye of the user, and a left-eye image display unit 104b that displays an image on the left eye of the user. Since the two image display units have the same configuration, the following description will be made without particularly distinguishing between the image display unit for the right-eye "a" and the image display unit for the left-eye "b".

First, the image display unit 104 generates an image to be displayed by an image quality correction unit 102 and an image projection unit 103 on the basis of an image data transmitted from an image input unit 101. The image quality correction unit 102 corrects color and brightness of the image to be displayed. The image projection unit 103 is configured with using a small-sized projector including a light source and is an optical system that projects a virtual image of the image. That is, when the user directly looks into the image projection unit 103, a two-dimensional image can be viewed at a certain distance. Herein, the distance at which the image (virtual image) is projected may be a certain finite distance or may be an infinite distance.

The image generated by the image projection unit 103 is emitted as a ray group that projects a virtual image at a certain distance. The ray group has wavelengths corresponding to at least three colors of red (R), green (G), and blue (b), and the user can view a color image. In addition, the ray group has an enlargement of about 40 degrees in the horizontal direction and about 20 degrees in the vertical direction, and it is possible to view an image having a wide field of view (FOV) of the projected virtual image.

The ray group emitted from the image projection unit 103 is incident on a light-guiding plate 200 through an incident coupler 201. The incident coupler 201 converts the direction of the ray group incident on the light-guiding plate into the direction in which the ray group can propagate in the light-guiding plate 200 by total reflection. At this time, by performing the conversion while maintaining the relative relationship of ray directions of the ray group, it is possible to display a high-precision image without distortion or blur of the image.

The ray group incident on the light-guiding plate 200 propagates by repeating total reflection and is incident on an eye-box enlargement unit 202. The eye-box enlargement unit 202 has a function of enlarging an eye-box (a region where a virtual image can be visually recognized) where a user can view the image. If the eye-box is wide, the stress by making it difficult for the user to see the edge of the eye-box is reduced, and the influence of individual differences in the wearing condition and the position of the eyes of the user is reduced, so that a high sense of presence can be obtained.

In the eye-box enlargement unit 202, the incident ray group is duplicated while maintaining the relative relationship in the ray directions and is emitted to an outgoing coupler 203. That is, the ray group emitted from the image projection unit 103 is spatially enlarged while maintaining the relative relationship of the ray directions (angles).

The outgoing coupler 203 emits the incident ray group out of the light-guiding plate 200 and transmits the ray group to the eyes of the user 1. That is, as opposed to the incident coupler 201, the outgoing coupler 203 converts the direction of the incident ray group into the direction in which the ray group can be emitted out of the light-guiding plate 200.

The outgoing coupler 203 also has a function of enlarging the eye-box in a direction different from the direction in which the ray group can be enlarged by the eye-box enlargement unit 202 at the same time. In other words, the ray group incident on the outgoing coupler 203 is duplicated and is spatially enlarged while maintaining the relative relationship of the ray directions, and the ray group is emitted out of the light-guiding plate 200.

The above-described configuration is substantially common to the right-eye image display unit 104a and the left-eye image display unit 104b. With the above-described configuration, the user 1 can view the image (virtual image) displayed on the two image display units 104a and 104b.

In the video display device 100 of FIG. 1A described above, only the portion of the outgoing coupler 203 that is a portion of the light-guiding plate 200 can be seen, but the other portions of the light-guiding plate 200 are hidden by the black frame portion so that the other portions of the light-guiding plate cannot be seen from outside. This is because, if light (external light) of the outside world is incident on the light-guiding plate 200 from an unintended angle, the light may become stray light and degrades the image quality of the displayed image. Therefore, portions other than the outgoing coupler 203 are allowed to be invisible from the outside world as much as possible, so that external light is allowed not to be incident on the light-guiding plate 200.

Configuration of Light-Guiding Plate

FIG. 3A is a schematic view illustrating the entire configuration of the light-guiding plate 200. The light-guiding plate 200 includes an incident coupler 201, an eye-box enlargement unit 202, and an outgoing coupler 203, and theses components are accommodated in a substrate made of a synthetic resin such as glass or plastic, and have a thickness of about 1 to 2 mm. As described above, the ray group 220 emitted from the image projection unit 103 has a wide wavelength range corresponding to the RGB light and a wide angular range corresponding to the FOV of 40 degrees in the horizontal direction (X direction) and 20 degrees in the vertical direction (Y direction), and the ray group 220 is incident on the incident coupler 201 in the Z direction. FIG. 3A illustrates a path of the center ray 221 of the ray group 220 in the light-guiding plate 200. The center ray 221 corresponds to a pixel substantially at the center of the displayed image and is actually a light flux having a finite thickness of several millimeters.

The incident coupler 201 is configured with a volume-type hologram which is a light diffracting portion and converts the direction of the ray group 220 incident in the Z direction to the in-plane direction (XY plane) of the light-guiding plate 200. In addition, in a case where the ray group 220 from the image projection unit 103 is inclinedly incident on the light-guiding plate 200, a prism may be used instead of the volume-type hologram. The ray group 220 emitted from the incident coupler 201 propagates inclinedly toward the eye-box enlargement unit 202 due to internal reflection in the light-guiding plate 200. Herein, the term "inclined" denotes that the horizontal direction (X direction) and the vertical direction (Y direction) have different angles in an in-plane (XY plane) parallel to the surface of the light-guiding plate 200.

The eye-box enlargement unit 202 reflects the ray group 220 that has propagated through the light-guiding plate 200 by a beam splitter surface and a mirror surface, which will be described later, and allows the ray group to propagate inclinedly toward the outgoing coupler 203. At this time, the ray group 220 is duplicated by the beam splitter surface while maintaining the relative relationship of the ray directions, so that the eye-box by which the user views the image is enlarged.

The outgoing coupler 203 is configured with a volume-type hologram which is a light diffracting portion and converts the direction of the incident ray group and emits the ray group out of the light-guiding plate 200 in the Z direction. Herein, in a case where the incident coupler 201 is configured with a volume-type hologram, the volume-type holograms of the incident coupler 201 and the outgoing coupler 203 are set so that the relationship between the wavelengths and the angles of the diffracted rays become substantially the same. Accordingly, it is possible to improve the light use efficiency of the light-guiding plate 200.

Figure 3B:
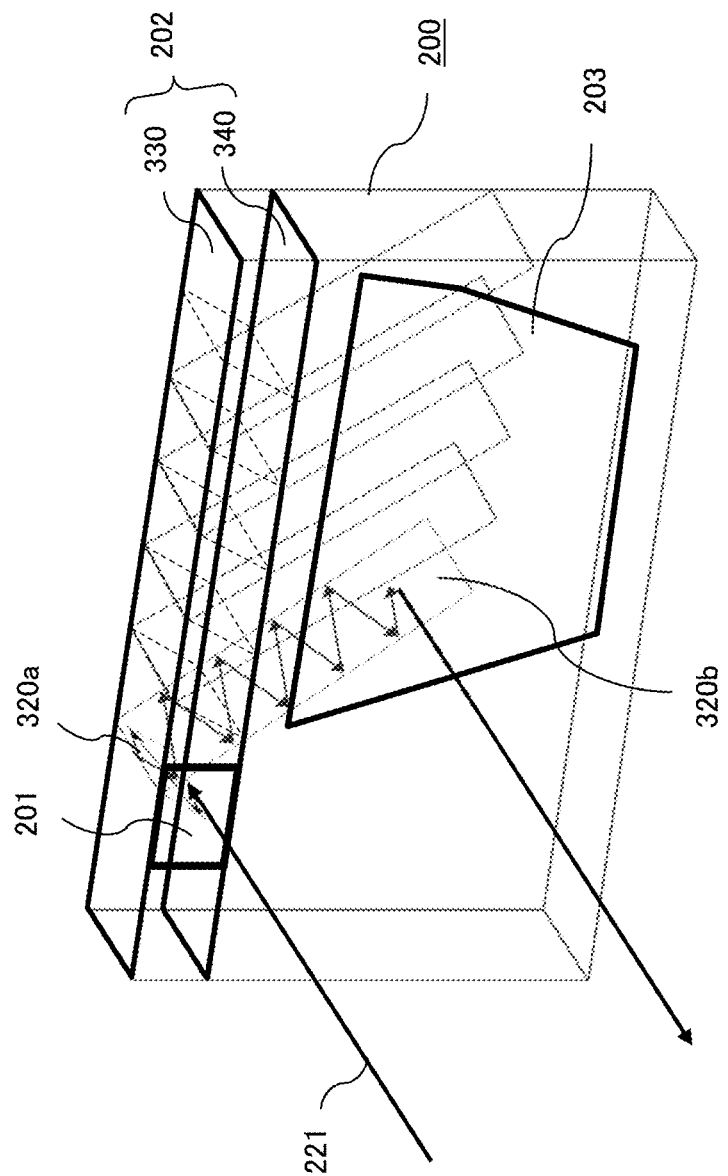
FIG. 3B is an enlarged view illustrating a detailed configuration of the light-guiding plate 200.

FIG. 3B is an enlarged view illustrating a detailed configuration of the light-guiding plate 200. FIG. 3A is a view viewed from the opposite side in the Z direction, and herein, the path of the center ray 221 of the ray group 220 in the light-guiding plate 200 is enlarged.

The center ray 221 emitted from the incident coupler 201 has an incident angle with respect to the surface of the light-guiding plate 200 that satisfies the condition of total reflection and propagates in the light-guiding plate by total reflection. A light-guiding surface 320a indicates the surface on which the center ray 221 emitted from the incident coupler 201 is guided.

The eye-box enlargement unit 202 has a structure of being interposed between a mirror surface 330 and a beam splitter surface 340. The mirror surface 330 is configured with a mirror having a reflectance of approximately 100%, and the beam splitter surface 340 is configured with a partially-transmitting mirror having a reflectance of approximately 90%. The mirror surface 330 and the beam splitter surface 340 are manufactured by a dielectric multilayer film or metal vapor deposition and are designed to be applicable to a ray group 220 having a wide wavelength range corresponding to the RGB light and a wide angular range corresponding to an FOV of 40 degrees horizontally×20 degrees vertically.

The center ray 221 that is incident on the eye-box enlargement unit 202 is reflected by the mirror surface 330 and propagates in a light-guiding surface 320b by total reflection. Then, about 90% of the light amount is reflected by the beam splitter surface 340, and the remaining about 10% of the light amount is transmitted and incident on the outgoing coupler 203. The light reflected by the beam splitter surface 340 propagates by total reflection, is reflected again by the mirror surface 330, and is incident on the beam splitter surface 340. At that time, similarly, about 90% of the light amount is reflected and directed to the mirror surface 330 again, and the remaining about 10% of the light amount is transmitted and incident on the outgoing coupler 203. Accordingly, in the eye-box enlargement unit 202, the reflection is repeated between the mirror surface 330 and the beam splitter surface 340, and a portion of the light amount transmitted through the beam splitter surface 340 is incident on the outgoing coupler 203 every time the light is reflected. The reflectance of the beam splitter surface 340 needs to be designed so that the light amount (the light amount in the eye-box) emitted by the outgoing coupler 203 is substantially uniform, and the light amount is not necessarily about 90%. In addition, the reflectance distribution of the mirror surface 330 and the beam splitter surface 340 may be uniform or may be designed to have a non-uniform distribution so that the light amount in the eye-box is substantially uniform.

Configuration of Incident Coupler

Figure 4A:
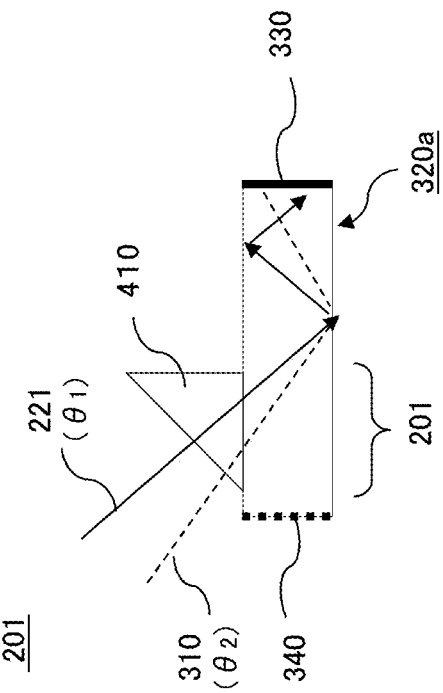
FIG. 4A is a schematic view when the incident coupler 201 is configured with a volume-type hologram.

FIG. 4A is a schematic view in a case where the incident coupler 201 is configured with a volume-type hologram (Ho), and the light-guiding surface 320a is extracted and drawn to be parallel to the paper surface. When the center ray 221 is incident, the center ray is diffracted by the volume-type hologram Ho which is a light diffracting portion, and thus, the direction of the ray is converted into an incident angle that satisfies the total reflection condition with respect to the surface of the light-guiding plate 200. The holograms (plane wave holograms) recorded by plane waves are multiple-recorded on the volume-type hologram Ho. When a ray group having a wide wavelength range corresponding to RGB and a wide angular range corresponding to a FOV of 40 degrees horizontally×20 degrees vertically is incident, the ray direction is converted while maintaining the relative angular relationship. That is, when the peripheral ray 310 which is a ray having an angle different from that of the center ray 221 is incident, the peripheral ray is diffracted to an angle different from that of the center ray 221, and the relative angular relationship between the two rays is maintained.

That is, in a case where the light is incident at "the incident angle $\theta_1$ of the center ray 221 to the light-guiding plate 200<the incident angle $\theta_2$ of the peripheral ray 310 to the light-guiding plate 200", the light is emitted from the incident coupler 201 at "the incident angle $\theta_1'$ of the center ray 221 to the light-guiding plate<the incident angle $\theta_2'$ of the peripheral ray 310 to the light-guiding plate", and the relationship is established by a combination of substantially arbitrary two rays in the incident ray group 220. This is a configuration called a reflection-type hologram. On the contrary, in a configuration called a transmission-type hologram, the light is emitted at "the incident angle $\theta_1'$ of the center ray 221 to the light-guiding plate>the incident angle $\theta_2'$ of the peripheral ray 310 to the light-guiding plate", and the relationship is established by a combination of arbitrary two rays in the incident ray group. Herein, the incident angle is an angle measured from a perpendicular line of the surface of the light-guiding plate. In addition, by changing the forming conditions of the hologram, in relation to the angular range of the ray group, the angle difference ($\theta_2'-\theta_1'$) between the two rays after the diffraction and the angle difference ($\theta_2-\theta_1$) between the two rays before the diffraction can be determined to be different. Accordingly, the degree of freedom in design of the optical system is further improved.

The volume-type hologram Ho of the incident coupler 201 is configured with a photosensitive material such as a photopolymer, and both sides thereof are interposed between substrates made of a glass or a synthetic resin such as plastic, as illustrated in FIG. 4A. In addition, the periphery (left and right in the figure) is also sealed (closed) and have a role of protecting the volume-type hologram Ho from the influence of the outside air, moisture, impact, dust, and the like. Furthermore, the surface of the light-guiding plate may be coated in order to protect the light-guiding plate from the influence of ultraviolet rays and the like. A method of manufacturing such a volume-type hologram will be described later with reference to FIG. 15.

Figure 4B:
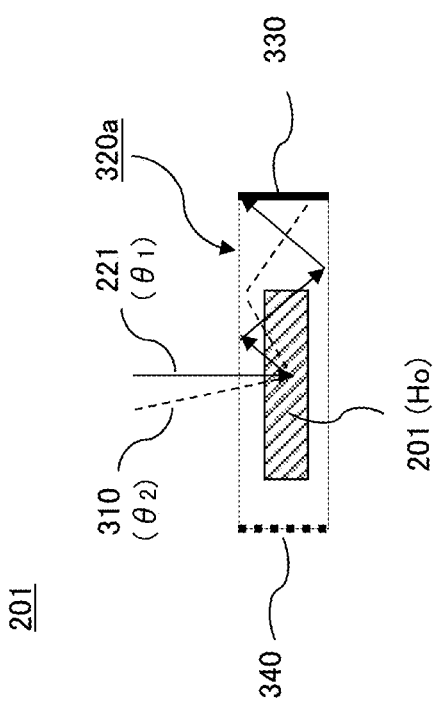
FIG. 4B is a schematic view when the incident coupler 201 is configured with a prism.

FIG. 4B is a schematic view in a case where the incident coupler 201 is configured with the prism 410, and the light-guiding surface 320a is extracted and drawn similarly to FIG. 4A. In this case, the configuration is so simple that the ray group (herein, the center ray 221 and the peripheral ray 310 are illustrated) is allowed to be incident in the light-guiding plate at a total reflection angle by the prism 410. Even with the configuration, the characteristic of the volume-type hologram that "the relative angular relationship between the two rays is maintained" is automatically satisfied. However, it is not possible to allow the angular ranges (angle difference) of the ray group before and after the incidence to be different, which is possible with the volume-type hologram.

Configuration of Outgoing Coupler

FIG. 5 is a schematic view illustrating the configuration of the outgoing coupler 203, and the light-guiding surface 320b is extracted and drawn. The outgoing coupler 203 is configured with a volume-type hologram Ho in which a plane wave hologram is multiple-recorded. In addition, in a case where the incident coupler 201 is configured with the volume-type hologram Ho, the volume-type hologram used for the incident coupler 201 and the outgoing coupler 203 have substantially the same configuration of the multiple-recorded plane wave holograms. Therefore, the relative wavelength and angular relationships between the ray group incident on and the ray group emitted from the light-guiding plate 200 become the same.

A portion of the incident ray 505 propagating in the light-guiding surface 320b by total reflection is changed in direction by diffraction by the volume-type hologram Ho of the outgoing coupler 203, which is a light diffracting portion, and then, the incident ray 505 is emitted to the outside of the light-guiding plate 200. The diffraction efficiency of the volume-type hologram Ho is about 10%, and the remaining about 90% of the transmitted light component that has not been diffracted propagates by total reflection and is diffracted again by the volume-type hologram Ho of the outgoing coupler 203. By repeating the diffraction, the rays are emitted at substantially equal intervals from substantially the entire range of the outgoing coupler 203 in the light-guiding surface 320b, and all the outgoing rays 510 are substantially parallel to each other. Although only one arbitrary ray 505 is illustrated in the figure, all rays of the ray group propagating in the light-guiding surface 320b are similarly emitted. Accordingly, all the incident rays in a certain direction are emitted with substantially the same emission angle. Therefore, an image is formed on the retina of the user 1, and one pixel of the image projected by the image projection unit 103 is focused on one point on the retina, so that a high-resolution image can be visually recognized. In the above-described description, it is assumed that the image is displayed at infinity, but the situation is almost the same even in a case where the image is displayed at a finite distance that is somewhat apart.

Herein, the characteristics of both the volume-type holograms when both the incident coupler 201 and the outgoing coupler 203 are configured with the volume-type hologram will be described.

Figure 6:
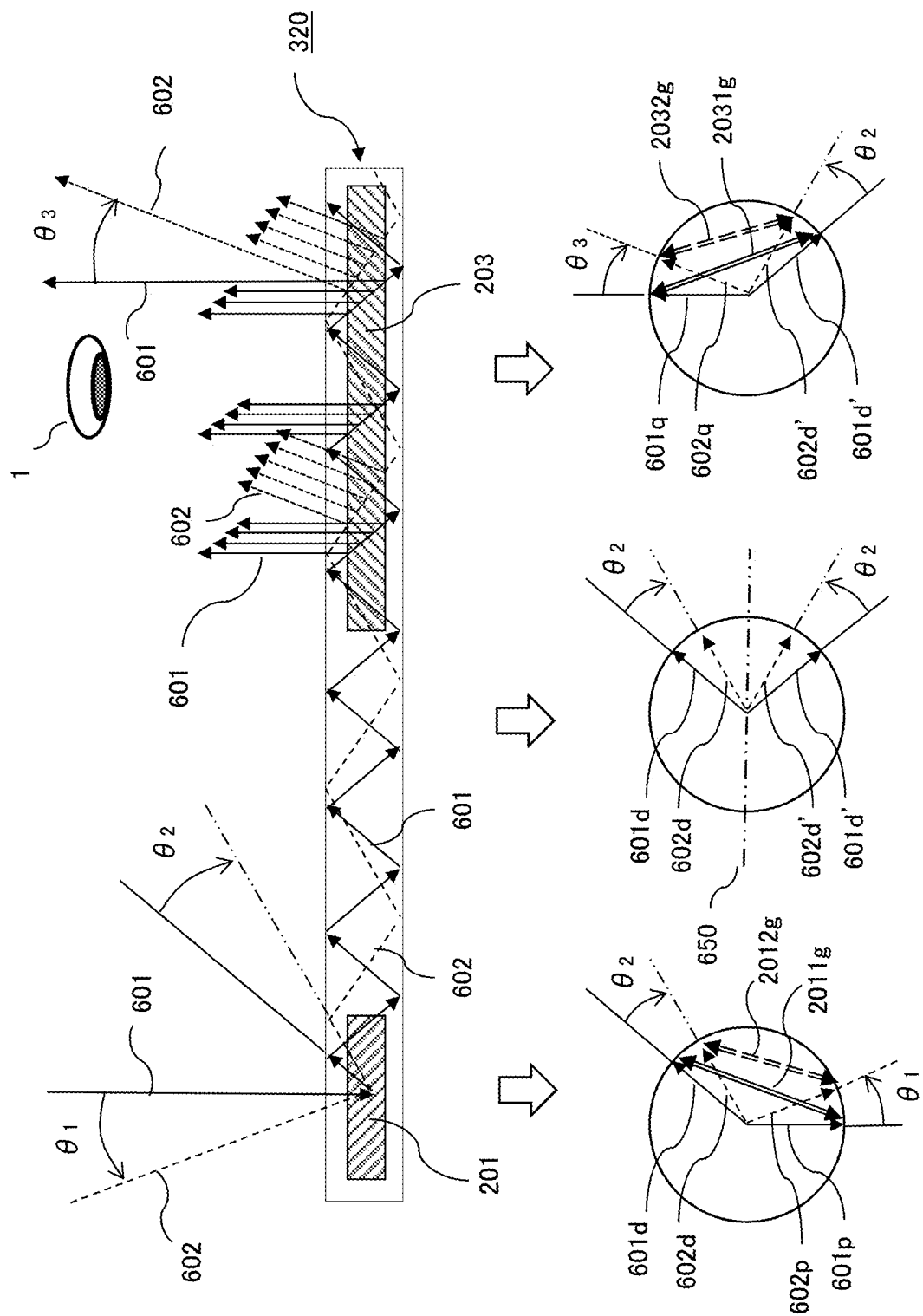
FIG. 6 is a ray diagram in the light-guiding surface when both the incident couplers and the outgoing coupler are configured with volume-type holograms.

FIG. 6 is a ray diagram in the light-guiding surface when both the incident coupler and the outgoing coupler are configured with the volume-type hologram. The lower row illustrates the corresponding Ewald sphere representation. The volume-type hologram is configured as a reflection-type hologram. The light-guiding surface 320 is illustrated as connecting the light-guiding surface 320a and the light-guiding surface 320b in FIG. 3B, and the folding by the mirror surface 330 and the beam splitter surface 340 interposed therebetween is omitted. Even if the above components are omitted in description, the description of the basic operation is the same.

Now, a situation is assumed where a first ray 601 and a second ray 602 are incident on the incident coupler 201. The angle (the angle measured in counterclockwise rotation from the first ray 601 in the figure) between the first and second rays 601 and 602 is set to $\theta_1$. These two rays are diffracted by the incident coupler 201, and the angles are changed. The angle (the angle measured in clockwise rotation from the first ray in the figure) between the two converted rays 601 and 602 is set to $\theta_2$. Furthermore, these two rays propagate in the light-guiding surface 320 by total reflection, are diffracted by the outgoing coupler 203, are changed in angle again, and are emitted to the outside of the light-guiding plate 200. The angle (the angle measured in clockwise rotation from the first ray in the figure) between the two rays 601 and 602 after the emission is set to $\theta_3$. Herein, all the angles are angles inside the light-guiding plate, and the angles outside the light-guiding plate can be calculated by using Snell's law, but in order to avoid complicating the drawings, the angles are omitted in this description.

In the lower portion of FIG. 6, the direction of the ray is represented by an Ewald sphere. First, in the incident coupler 201, when k vectors 601p and 602p corresponding to the first and second rays are incident, diffraction is performed by grating vectors 2011g and 2012g recorded on the volume-type hologram of the incident coupler 201, and thus, k vectors 601d and 602d of the diffracted light are emitted. Herein, the case is illustrated where the two grating vectors 2011g and 2012g are non-parallel, and thus the angle formed by the two rays 601 and 602 is different before the diffraction ($\theta_1$) and after the diffraction ($\theta_2$). The k vectors of the two diffracted lights satisfy the total reflection condition of the light-guiding plate and are propagate while the k vectors 601d and 602d and the k vectors 601d' and 602d' are alternately converted. When the light is incident on the outgoing coupler 203, a portion of the light having the k vectors 601d' and 602d' is diffracted by grating vectors 2031g and 2032g recorded on the volume-type hologram of the outgoing coupler 203, k vectors 601q and 602q of the diffracted light are emitted out of the light-guiding plate.

In the above-described operation, the angular relationship between arbitrary two rays is indicated by $\theta_1$, $\theta_2$, and $\theta_3$. Herein, it is not always necessary that $\theta_1=\theta_2=\theta_3$, and for example, a relationship such as $\theta_1>\theta_2<\theta_3$ or $\theta_1<\theta_2<\theta_3$ may be employed. Accordingly, the degree of freedom in design for obtaining effects such as facilitating manufacturing the hologram, improving the ray density, and enlarging the FOV is widened. However, as a condition for obtaining an image with high efficiency and high image quality, there is a need for a relationship that the grating vector 2011g of the incident coupler 201 and the grating vector 2031g of the outgoing coupler 203 are inverted (folded) axis-symmetrically with respect to a line 650 parallel to the surface of the light-guiding plate. In addition, the grating vectors 2012g and 2032g need to have the same relationship. Accordingly, the grating vector group recorded on the volume-type hologram of the incident coupler 201 and the grating vector group recorded on the volume-type hologram of the outgoing coupler 203 are inverted (folded) axis-symmetrically with respect to the line 650 parallel to the surface of the light-guiding plate, so that it is possible to obtain an image with high efficiency and high image quality.

Effect of Eye-Box Enlargement

FIG. 7 is a view for describing the effect of the eye-box enlargement unit 202 and illustrating the entire light-guiding plate 200. In FIGS. 5 and 6 described above, although one light-guiding surface such as the light-guiding surfaces 320a and 320b has been described, the light-guiding surfaces are duplicated by the operation of the eye-box enlargement unit 202 described in FIG. 3B, and multiple duplications of the light-guiding surface 320b are penetrated in the outgoing coupler 203. At each light-guiding surface, since the rays are emitted from substantially the entire range of the outgoing coupler 203, if a plurality of light-guiding surfaces are arranged, the outgoing ray 701 is emitted from substantially the entire range of the outgoing coupler 203. As a result, the incident ray 700 incident on the light-guiding plate 200 is spatially enlarged two-dimensionally and is emitted from the light-guiding plate 200. Accordingly, the range (area) of the eye-box can be enlarged two-dimensionally.

FIGS. 8A and 8B are views illustrating the density of outgoing rays emitted from the outgoing coupler 203. FIG. 8A schematically illustrates the position of a ray 701 emitted from the outgoing coupler 203 when one ray is incident on the light-guiding plate 200. In addition, in FIG. 8B, a second beam splitter surface 800 having a transmittance of about 50% is added substantially at the center between the mirror surface 330 and the beam splitter surface 340 by changing the structure of the eye-box enlargement unit 202. Due to the added second beam splitter surface 800, the number of light-guiding surfaces duplicated in the eye-box enlargement unit 202 is improved approximately two times. That is, the density of the outgoing rays 701 can be improved approximately two times. When the density of the outgoing rays is high, unevenness in brightness, unevenness in color, flicker, and the like of the image are reduced, and the image quality of the image can be improved.

So far, the basic configuration and operation of the light-guiding plate 200 have been described. Next, the configuration of the volume-type hologram used for the incident coupler and the outgoing coupler for improving the optical efficiency of the light-guiding plate will be described in detail. First, the relationship between the number of hologram multiple-recordings and the optical efficiency will be described.

Characteristics of Image Rays

FIGS. 9A and 9B are views illustrating characteristics of image rays used in the video display device 100. FIG. 9A illustrates an example of a wavelength spectrum distribution of a ray group incident on the light-guiding plate 200 from the image projection unit 103. In the embodiment, it is assumed that a broad (broadband) wavelength spectrum distribution as illustrated in the figure is provided. The wavelength spectrum distribution is a spectrum distribution having a substantially constant intensity (power) with respect to the visible region of 400 to 700 nm, and for description, an ideal light source is assumed.

In addition, FIG. 9B illustrates the field of view (FOV) of the image visually recognized by the user on the image display unit 104, and the angle in the horizontal direction (X direction) is denoted by $\theta$, and the angle in the vertical direction (Y direction) is denoted by $\phi$. The definition of the direction matches the X direction and the Y direction in FIG. 3A. The magnitude of the FOV is assumed to be a wide angular range of, for example, a horizontal angle $\theta=40$ degrees and a vertical angle $\phi=20$ degrees.

Optical Efficiency of Volume-Type Hologram

Figure 10A:
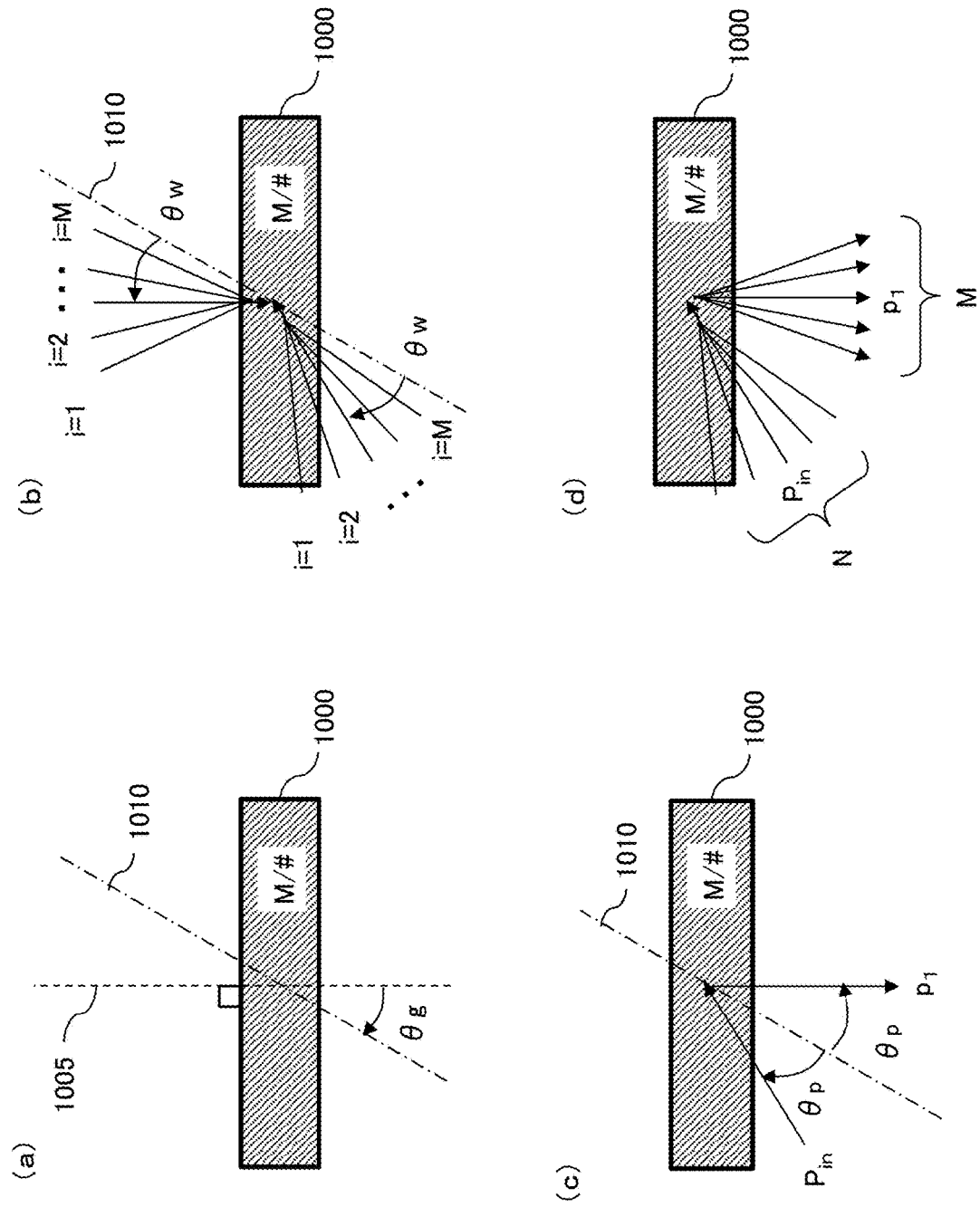
FIG. 10A is a view describing multiple-recording of a hologram and diffraction efficiency in a single wavelength light.

FIG. 10A is a view describing multiple-recording of a hologram and diffraction efficiency (optical efficiency) at a single wavelength.

(a) illustrates the angular relationship between the recording medium 1000 and the reflection axis 1010. The reflection axis 1010 is inclined from the perpendicular line 1005 of the recording medium 1000 by an angle $\theta g$.

(b) illustrates a hologram multiple-recording method. In the configuration, a two-beam plane wave hologram is multiple-recorded on the recording medium 1000. In the case of i=1, 2, 3, . . . , M and performing multiple-recording of M times, recording is sequentially performed by changing the angle of the two light fluxes to be recorded symmetrically with respect to the reflection axis 1010 as illustrated in the figure. Herein, the angle from the reflection axis 1010 is set to $\theta w$, and the two light fluxes are incident at an angle inclined by $\theta w$ to record holograms. As a result, the holograms having M different grating intervals according to the angle $\theta w$ are multiple-formed. A wavefront (equal-phase surface) of the recording light of the two light fluxes may be of a plane wave or may have a special function as a wavefront shape having an aberration. For the two light fluxes, a laser beam or the like having high spatial and temporal coherence at the same wavelength is suitable.

(c) illustrates a case where the hologram multiple-recorded in (b) is reproduced by a single ray (single wavelength). In the configuration, it is assumed that one ray having a power of Pin is incident at an angle $\theta p$ from the reflection axis 1010, and one ray having a power of $p_1$ is diffracted (reproduced) by the multiple-recorded hologram. At this time, the direction of diffraction (reproduction) is substantially symmetric with respect to the reflection axis 1010. The efficiency of the diffracted light at this time will be described. First, diffraction efficiency $\eta_M$ of the hologram is expressed as in Mathematical Formula 1.

$$\eta_M = \frac{p_1}{P_{in}} \qquad \text{[Mathematical Formula 1]}$$

Herein, the M number (M/#) will be described. M/# is an index indicating the performance of multiple-recording of the hologram on the recording medium and is defined by Mathematical Formula 2.

$$M/\# = \sum_{i=1}^{M} \sqrt{\eta_i} \qquad \text{[Mathematical Formula 2]}$$

Herein, $\eta_i$ represents the diffraction efficiency of the i-th recorded hologram, and M is the number of multiple-recordings. At the time of measuring the M/# of the recording medium, M/# is obtained from Mathematical Formula 2 by recording the plane wave hologram by angular multiple-recording with two plane wave light fluxes until the diffraction efficiency becomes almost 0 (until the M/# is depleted), and measuring the diffraction efficiency by reproducing this hologram. The diffraction efficiency $\eta_i$ can be calculated by Mathematical Formula 1.

For simplicity, in a case where all $\eta_i$ are substantially the same and $\eta_i=\eta_M$ ($\eta_M$ is a constant), M/# is as expressed in Mathematical Formula 3. By transforming Mathematical Formula 3, the diffraction efficiency $\eta_M$ is expressed by Mathematical Formula 4.

$$M/\# = M\sqrt{\eta_M} \qquad \text{[Mathematical Formula 3]}$$

$$\eta_M = \frac{p_1}{P_{in}} = \left(\frac{M/\#}{M}\right)^2 \qquad \text{[Mathematical Formula 4]}$$

That is, it can be understood that, in a case where M multiple-recordings are performed on a recording medium having a certain M/# until M/# is depleted, the diffraction efficiency $\eta_M$ of each recorded hologram is inversely proportional to the square of the number M of multiple-recordings.

Figure 11:
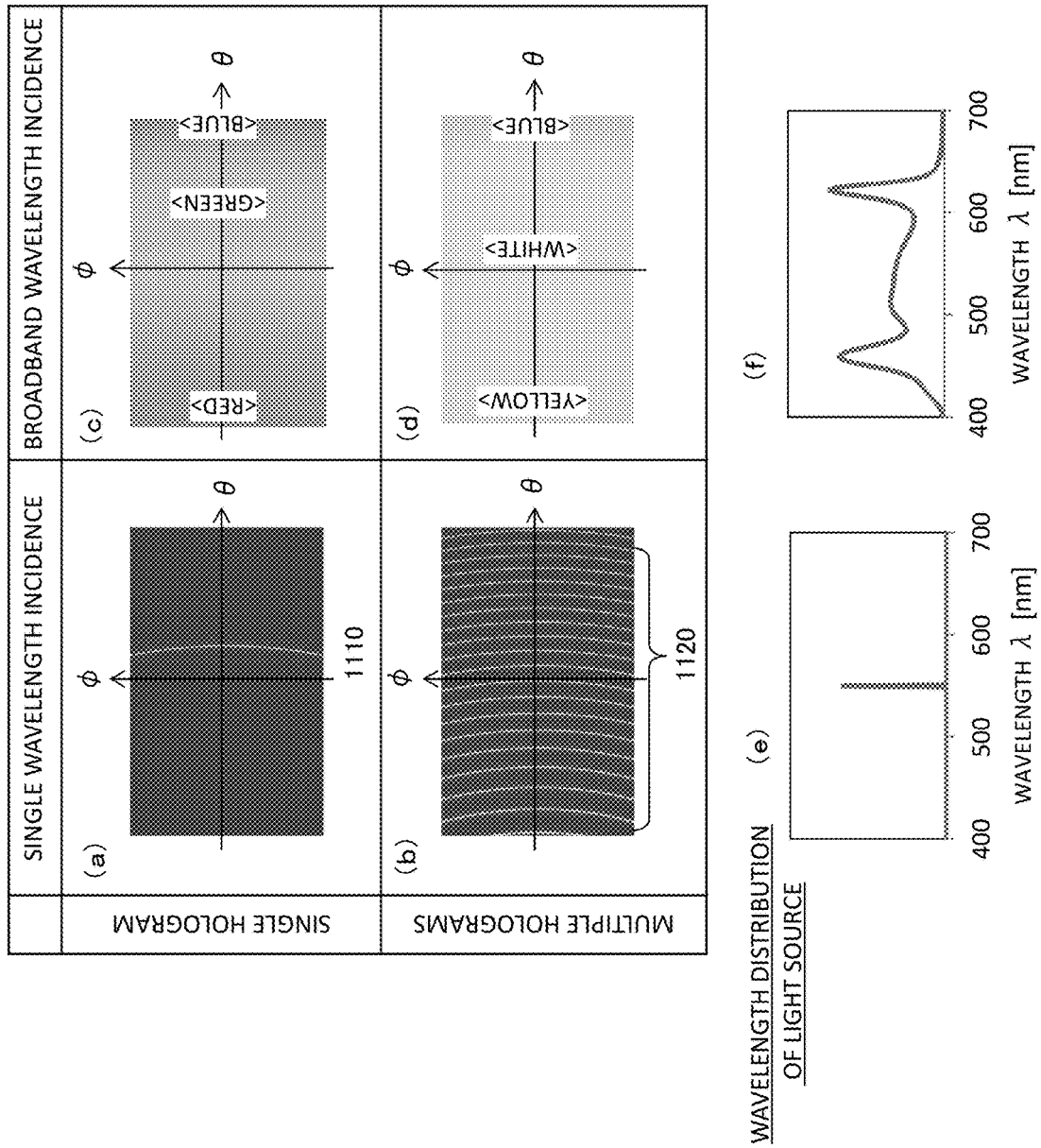
FIG. 11 is a view illustrating a simulation result of a visually-recognized image by hologram diffracted light.

Next, (d) illustrates a configuration in which reproducing is performed by a plurality (N) of incident rays having different angles. The N incident rays may be considered to be a ray group emitted from the image projection unit 103, and if one pixel of the projected image is set to one ray, reproducing is performed by the ray group corresponding to N pixels. If it is assumed that the N rays have a single wavelength, in this case, since the hologram has been subjected to the M multiple-recordings, the ray group of M rays (M≤N) will be reproduced. In addition, herein, the Bragg degeneration described later with reference to FIG. 11 is ignored, the rays only on the paper surface (incident surface) are considered, and the depth direction (reflecting surface) is not considered. When it is assumed that the optical efficiency H at this time is [Sum of the reproduced light amounts]/[Sum of the incident light amounts], the optical efficiency is calculated as in Mathematical Formula 5.

$$H_{N,M} = \frac{Mp_1}{NP_{in}} = \frac{(M/\#)^2}{NM} \qquad \text{[Mathematical Formula 5]}$$

In other words, in a case where the hologram obtained by performing multiple-recording M times on the recording medium having a certain M/# until M/# is depleted is reproduced by N incident rays, the optical efficiency $H_{N,M}$ is inversely proportional to the number N of incident rays and the number M of multiple-recordings. Therefore, when the number N of incident rays is the same for the same M/#, the optical efficiency becomes maximum in a case where the number M of multiple-recordings M=1 (minimum value), and as the number M of multiple-recordings is increased, the optical efficiency is decreased. That is, the optical efficiency is lost, and the present invention focuses on this relationship. In the above-described description, a case where the wavelength of the incident ray is single is considered, but the same conclusion can be obtained even with a broadband wavelength.

FIG. 10B is a view illustrating comparison of the optical efficiencies including incident light of a broadband wavelength. Herein, in the case of recording a single hologram or multiple holograms on a recording medium 1000 having a certain M/# and allowing a plurality (N) of rays having a single wavelength or a broadband wavelength and different incident angles to be incident on these holograms, the optical efficiencies for the combinations of the four methods (a) to (d) are summarized in a table.

(a) and (b) are the case of single-wavelength light incidence, in which the wavelength spectrum distribution (Pin–λ) of N incident rays has a single spectrum. (a) is the case of a single hologram, in which the angular distribution $(p_1-\theta)$ of the diffracted light is only in a single direction, and the optical efficiency H is of a case where M=1 in Mathematical Formula 5.

(b) is the case of the multiple-recorded hologram, in which the angular distribution $(p_M-\theta)$ of the diffracted light is in directions of the number M of multiple-recordings, and the optical efficiency is the same as that described with reference to FIG. 10A (d).

(c) and (d) are the case of broadband wavelength incidence, in which the wavelength spectrum distribution (Pin–λ) of the N incident rays has a spectrum width w. First, in the case of the single hologram of (c), since the Bragg-matched wavelength differs according to the angle of each ray, in the angular distribution $(p_1-\theta)$ of the diffracted light, the wavelength spectrum distribution (Pin–λ) is reflected. The relationship is expressed by Mathematical Formula 6.

$$\frac{\cos\theta_w}{\lambda_w} = \frac{\cos\theta_p}{\lambda_p} \qquad \text{[Mathematical Formula 6]}$$

Herein, λw is the wavelength at the time of recording, and λp is the wavelength at the time of reproduction. In addition, θp and θw are defined by FIG. 10A. Accordingly, since θp also is spread corresponding to the wavelength width w of λp, the spread of the light intensity distribution in the θ direction is denoted by αw. Herein, as a light intensity distribution approximately proportional to the wavelength width w, the proportional coefficient is set to α. α is given by optical parameters θw and λw at the time of recording by modifying Mathematical Formula 6. The optical efficiency $H^w_{N,1}$ at this time is as expressed in Mathematical Formula 7. This is a shape obtained by multiplying the optical efficiency $H^1_{N,1}$ at a single wavelength in (a) by a coefficient α.

$$H^w_{N,1} = \frac{p_1\alpha w}{NP_{in}w} = \alpha\frac{(M/\#)^2}{N} \qquad \text{[Mathematical Formula 7]}$$

In the case of the multiple-recorded hologram of (d), the description using the proportional coefficient α similarly to the above is made, and the optical efficiency $H^1_{N,M}$ at the single wavelength of (b) is multiplied by the coefficient α. Thus, it can be understood that, even in the case of the broadband wavelength incidence similarly to the case of the single wavelength, as the number M of multiple-recordings of the hologram is increased, the optical efficiency H is decreased. The above description is a very simplified one, and the actual optical efficiency may vary according to other factors that are not considered herein. The basic properties that "if the number M of multiple-recordings is increased, the optical efficiency is decreased" does not change.

FIG. 11 is a view illustrating a simulation result of a visually-recognized image by the hologram diffracted light and illustrates corresponding to the four reproduction conditions (a) to (d) in FIG. 10B. In this simulation, an image visually recognized in the field of view (FOV) of FIG. 9B was calculated. In addition, (e) and (f) illustrate the wavelength spectrum distribution of the light source used in the simulation. (e) is the distribution at the time of the single wavelength incidence (550 nm), and (f) is the distribution at the time of the broadband wavelength incidence. The incident image is assumed to be an image (entire white image) in which all pixels have certain values. In the multiple-recorded holograms of (b) and (d), 50 multiple-recordings were performed at substantially equal intervals at angles θw in the medium of 33 degrees to 58 degrees.

It can be understood from this result that, first, reproducing is performed with the Bragg degeneration in the φ direction (FOV vertical direction). The Bragg degeneration denotes a Bragg match condition in which a ray having an incident angle component in a direction (reflecting surface) perpendicular to the light incident surface at the time of the recording is reproduced. Herein, the θ direction (FOV horizontal direction) is an axis parallel to the incident surface of the ray at the time of recording, and the reproducing is performed in the φ direction perpendicular to the axis. In the single hologram of (a), reproducing is performed in a line shape (1110), which is the Bragg degeneration. In addition, in the multiple-recorded hologram of (b), the reproduction portion of a line shape (1120) is increased by the increased amount of the multiple-recording.

In addition, in a case where a broadband wavelength indicated by (f) is incident, an image can be visually recognized on the entire screen even with a single hologram in (c). However, since the reproduction angle θ and the wavelength λ correspond according to the Bragg match condition of Mathematical Formula 6, light of different wavelengths is reproduced in each direction, and as a result, a rainbow-colored image is visually recognized (in the figure, color names of <Red>, <Green>, and <Blue> are added for monochrome display).

(d) is a case where a broadband wavelength is incident on the multiple-recorded hologram, and the rainbow-colored image of (c) is shifted and overlapped in the θ direction to be reproduced, so that, even though the right and left ends are lightly colored, a white image can be visually recognized in almost the entire region. This is because, in each pixel (ray direction), when light with three wavelengths corresponding to at least RGB is reproduced and the RGB components with substantially the same levels are included by performing integration with a color matching function of the eyes of the user, the light is visually recognized as white. As described above, by using the multiple-recorded hologram, even in a case where the image light of the broadband wavelength is incident, the color unevenness and the brightness unevenness are reduced, and a uniform image can be visually recognized.

Figure 12A:
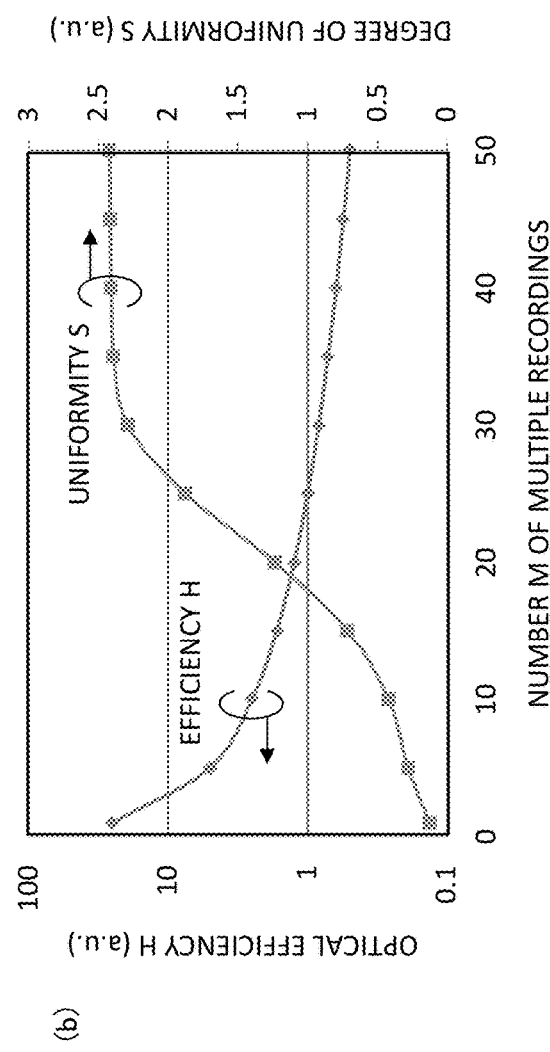
FIG. 12A is a view illustrating a relationship between the image quality of the visually-recognized image and the optical efficiency with respect to the number of hologram multiple-recordings.

Relationship Between Image Quality of Visually-Recognized Image and Optical Efficiency FIG. 12A is a view illustrating the relationship between the image quality of the visually-recognized image and the optical efficiency with respect to the number of hologram multiple-recordings. (a) illustrates the result obtained by simulation for the visually-recognized image, and (b) illustrates the result obtained by simulation for the image uniformity S of the image and optical efficiency H.

(a) illustrates a visually-recognized image in a case where the number M of multiple-recordings is changed from 1 to 50, and M=1 and M=50 correspond to FIGS. 11(*c*) and 11(*d*). By increasing the number M of multiple-recordings, the color unevenness and the brightness unevenness of the image are reduced, and a substantially uniform image can be visually recognized. In addition, the color unevenness of the vertical stripe pattern occurs up to the number M of multiple-recordings of about 30, but if M exceeds 30, the color unevenness is in the level that the color unevenness cannot be almost visually recognized.

(b) quantitatively illustrates a graph of the relationship between the uniformity S of the image quality and the optical efficiency H with respect to the number M of multiple-recordings. For the uniformity S of the image quality, an image is represented by a CIE L*a*b* color space, and the reciprocal number of the standard deviation (variation) value of the L* values over the entire screen is used as S. The evaluation of the uniformity of image quality is not limited to this method, and other methods may be used. On the other hand, the optical efficiency H is calculated by the above-described Mathematical Formula 5, and is expressed in arbitrary units.

It can be understood from this result that, if the number M of multiple-recordings is increased, the color unevenness and the brightness unevenness are small and the image quality is improved, but the optical efficiency H is decreased. Conversely, if the number M of multiple-recordings is decreased, the optical efficiency H can be improved, but the color unevenness and the brightness unevenness occur, and image quality is degraded. Thus, the image quality and the optical efficiency have a reciprocal relationship.

In the method of the related art, since the multiple-recording is performed so that Bragg selectivity substantially overlaps, for example, in Patent Document 2, the number M of multiple-recordings is increased to about 200, and a decrease in optical efficiency is inevitable. In other words, if the number M of multiple-recordings is increased, since the optical efficiency H at the time when the same M/# consumption amounts are set (assuming that all M/# is used up) is reduced, the optical efficiency H may be improved by reducing the number M of multiple-recordings as much as possible. In this case, the number M of multiple-recordings is set to a minimum number M of multiple-recordings at which the color unevenness and the brightness unevenness in the visually-recognized image do not cause a practical problem. In the case of this example, the minimum number M of multiple-recordings in which the visually-recognized image looks substantially white can be set to, for example, about 30. In addition, the color unevenness and the brightness unevenness of the image depend on the wavelength spectrum distribution of the light source. Therefore, it is effective to perform determination of the number of multiple-recordings and correction of the image based on the wavelength spectrum distribution of the light source. In addition, from the viewpoint of both the image quality and the optical efficiency, it is desirable that the wavelength spectrum distribution of the light source is broad (in a broad band). For this reason, it is preferable to use a pseudo white light emitting diode (LED) or the like as the light source.

In the simulation of FIG. 12A, calculation is performed under the assumption that each ray of the incident ray group has the wavelength spectrum distribution illustrated in FIG. 11(*f*). It can be considered that the incident coupler for the reason is assumed. As a result of the simulation, in a case where the number M of multiple-recordings in which the visually-recognized image looks substantially white is M≥30, actually, each pixel has a combination of spectra of various wavelengths, and the combination differs for each pixel. Therefore, each ray incident on the light-guiding plate by the incident coupler does not have a broad wavelength spectrum distribution as illustrated in FIG. 11(*f*) but has a jumping spectrum distribution (integration is performed with a color matching function of the eyes of the user, and white is obtained). When the ray group is incident on the outgoing coupler, the optical efficiency can be improved by setting an optimal multiple-recorded hologram for the wavelength spectrum distribution of each ray. Conversely, when there is no correlation between the multiple-recorded grating vector group of the incident coupler and the multiple-recorded grating vector group of the outgoing coupler, the optical efficiency is significantly reduced. Therefore, as described in FIG. 6, the grating vector group recorded on the volume-type hologram of the incident coupler 201 and the grating vector group recorded on the volume-type hologram of the outgoing coupler 203 are inverted (turned back) axis-symmetrically with respect to the line 650 parallel to the surface of the light-guiding plate, so that an image with high efficiency and high image quality can be obtained.

As a result of FIG. 12A, it is found that it is possible to suppress the decrease in optical efficiency H by setting the minimum number M of multiple-recordings (for example, 30) at which the color unevenness and the brightness unevenness of the visually-recognized image do not cause a practical problem. The diffraction condition of the multiple-recorded hologram in order to satisfy this will be described.

Required Conditions for Volume-Type Hologram

FIG. 12B is a view describing characteristics of a volume-type hologram suitable for an incident coupler and an outgoing coupler. In the volume-type hologram (light diffracting portion) 1200, holograms are multiple-recorded at the number M of multiple-recordings. Then, when an incident ray group 1210 having a single wavelength and a certain angular range is incident, an outgoing ray group 1220 is emitted. At this time, it is assumed that the wavelength of the incident ray group 1210 is the wavelength used at the time of recording the hologram on the light-guiding plate or the wavelength used at the time of reproducing the hologram recorded on the light-guiding plate. Herein, in a case where the incident ray group 1210 is a ray group having a substantially continuous angle, the outgoing ray group 1220 is emitted as a discrete ray group having a certain angular space θs. The angular space θs depends on the number M of multiple-recordings and the recording angle.

If one ray in the discrete ray group is focused on, the ray has a certain angular range (angle width) θa. The angular range θa can be described by Bragg selectivity determined by the thickness of the medium or the like. In the above-described description, for simplicity, the thickness of the medium is approximated to infinity which is very large in comparison with the wavelength. In this case, although the angular range θa becomes infinitesimally small, since the thickness of the medium is finite, the Bragg selectivity is widened, and the ray is emitted with a finite angular range θa. At this time, if the angular space θs is compared with the angular range θa, the condition is the relationship of θs≥θa. Herein, it is assumed that θa is an angle about twice the full width at half maximum) between 1st-null (. The "null" is a point at which the intensity of Bragg selectivity becomes 0 and is generally used as a unit for defining the range of the ray angle. As described above, by performing the multiple-recording of the volume-type hologram so that the single-wavelength light is emitted at a sufficiently jumping angle (discrete angle) at the time of incidence, as described above, the number of the multiple-recordings is small, and the optical efficiency can be improved.

Herein, the Bragg selectivity which is a factor of the angular range θa will be described. Mathematical Formula 8 represents a formula for calculating the Bragg selectivity.

$$\Delta\theta = \frac{\lambda_{Air}}{nL(\sin\theta_1 + \sin\theta_2)} \quad \text{[Mathematical Formula 8]}$$

Herein, Δθ is an angle corresponding to 1st-null of the sin c function curve of the Bragg selectivity. n is the medium refractive index, L is the medium thickness, $\lambda_{Air}$ is the recording and reproducing wavelengths in air, and this mathematical formula can be used when the recording and reproducing wavelengths are the same. $\theta_1$ and $\theta_2$ are the angles of the recording ray from the perpendicular line of the medium surface. From Mathematical Formula 8, the Bragg selectivity can be estimated. In addition, in a case where the recording wavelength and the reproducing wavelength are different, although the mathematical formula is somewhat complicated, the Bragg selectivity can also be calculated by extending this mathematical formula. In a case where θa is defined by an angle between 1st-null of the Bragg selectivity, θa can be calculated by θa=2Δθ.

It has been found that the optical efficiency H can be improved by reducing the number M of multiple-recordings. From the graph of FIG. 12A(b), in the case of the simulation example, the image uniformity S converges (saturates) at about 30 multiple-recordings. Therefore, although the number M of multiple-recordings is increased over the number, the image uniformity is not improved. Accordingly, one method of determining the optimum value of the number of multiple-recordings is to set the minimum number M of multiple-recording at which the evaluation value of the image quality converges (saturates). Practically, in a case where the recording is performed by equally dividing the inside of the recording range of θw into M, the recording angular space of θw may be approximately set to about 0.5 to 1 degrees.

In addition, since this result depends on the wavelength band of the light source, it is necessary to determine the optimum number M of multiple-recordings in consideration of the wavelength band of the light source. In this case, as the wavelength band is wider and broader, the number M of multiple-recordings can be reduced. Therefore, in order to improve the optical efficiency H, it is advantageous to use a light source having a wide wavelength band.

Furthermore, as an advantage obtained by performing multiple-recording of a volume-type hologram so that the single-wavelength light is emitted at a sufficiently jumping angle (discrete angle) at the time of incidence, the crosstalk of hologram diffracted light is reduced. When θs is not sufficiently apart (not large) as compared with θa, there is a possibility that the diffraction efficiency is unintentionally varied due to the crosstalk of the hologram diffracted light. This is because the crosstalk of the hologram diffracted light is influenced by the phase relationship of the recording light which is difficult to control at the time of recording, so that "strengthened interference" or "weakened interference" unintentionally occurs. Accordingly, this becomes a factor of degradation of the image quality of the displayed image such as the brightness unevenness and the color unevenness. In order to avoid this influence, it is useful to perform multiple-recording of a volume-type hologram so that the single-wavelength light is emitted at a sufficiently jumping angle (discrete angle) at the time of incidence, and in this case, by setting, for example, θs>kθa (k is a real number of 3 or more), the influence can be removed.

Figure 13:
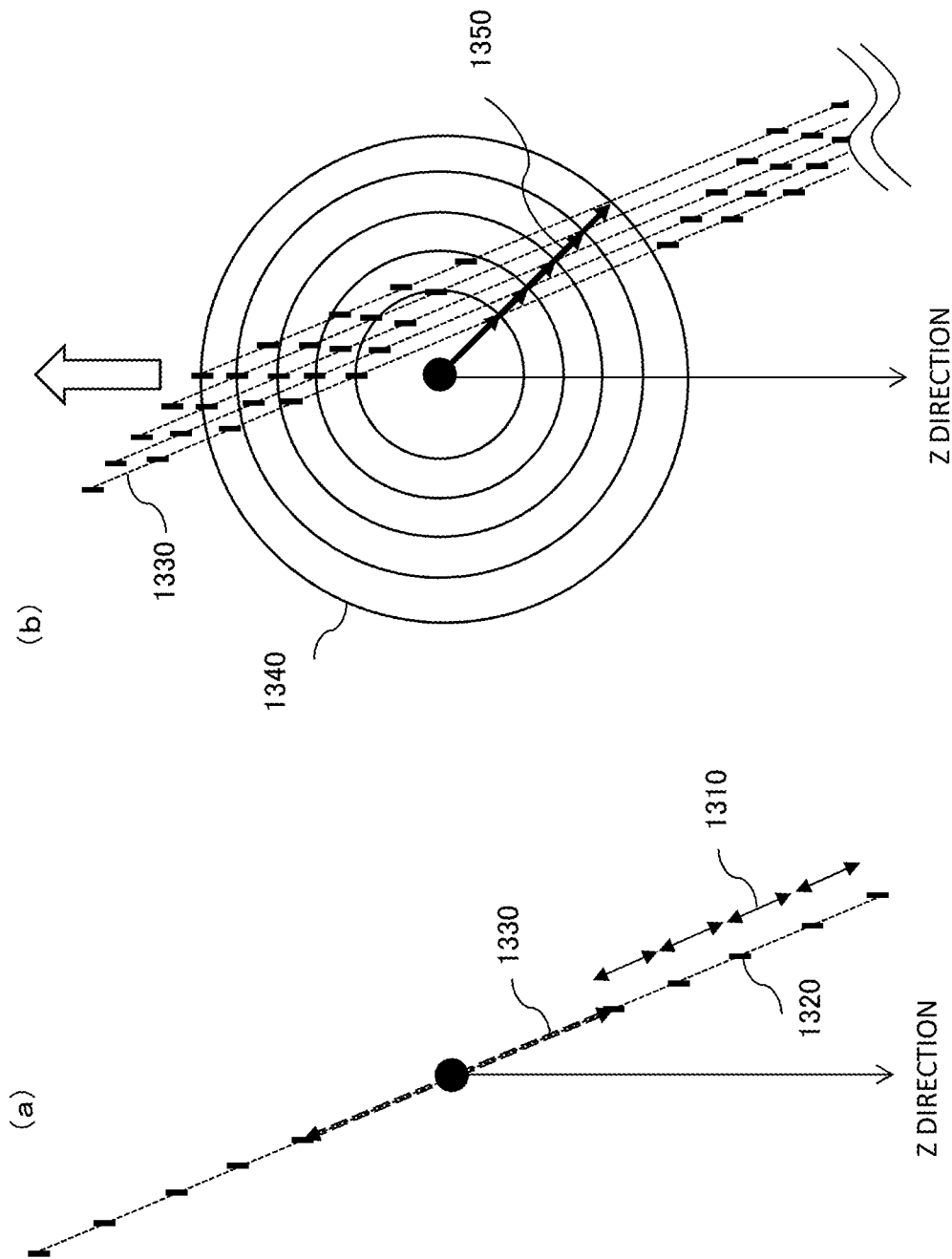
FIG. 13 is a view illustrating a multiple-recorded hologram represented by a K vector.

FIG. 13 is a view in which a multiple-recorded hologram satisfying the above-described conditions is represented by a K vector. (a) is a schematic view of the K vector of the multiple-recorded hologram. Herein, the K vector (hologram vector or grating vector) 1330 of the hologram is drawn. In addition, the distal end of the arrow of the multiple-recorded hologram vector is indicated by reference numeral 1320, and the fact that the line 1320 is indicated by a line parallel to the z direction illustrates the inside of 1st-null of the Bragg selectivity of the single wavelength. From this figure, it can be found that the intervals 1310 between the distal ends of the multiple-recorded holograms are substantially the same, and the inside of 1st-null of the Bragg selectivity of each single wavelength does not overlap. As described above, by setting the multiple-recording interval 1310 of the hologram to be wider than the Bragg selectivity, the optical efficiency can be improved.

(b) illustrates an example of the outgoing coupler for reproducing the hologram vector 1330 of (a). Incident light 1350 that has been guided (propagated) in the light-guiding plate is diffracted by the hologram vector 1330 that has been multiple-recorded. The incident light 1350 includes discrete wavelengths that satisfy the Bragg condition by the incident coupler, but since the outgoing coupler also inverts (folds) substantially the same holograms axis-symmetrically with respect to the surface of the light-guiding plate, the lights being Bragg-matched are emitted while maintaining the angle. When the emitted lights having the different wavelengths reach the eyes, it is desirable that the lights look white. However, as described above, if the recording angular space is too wide, the color unevenness and the brightness unevenness occur, and thus, the image quality of the image is degraded. On the other hand, it can be improved by performing image correction as described below.

Image Quality Correction

The image quality correction of the image is performed by the image quality correction unit 102 in FIG. 2. With respect to the image quality correction, the image quality correction method is determined according to the number of the volume-type hologram multiple-recordings used in the incident coupler 201 and the outgoing coupler 203 of the light-guiding plate 200.

Figure 14:
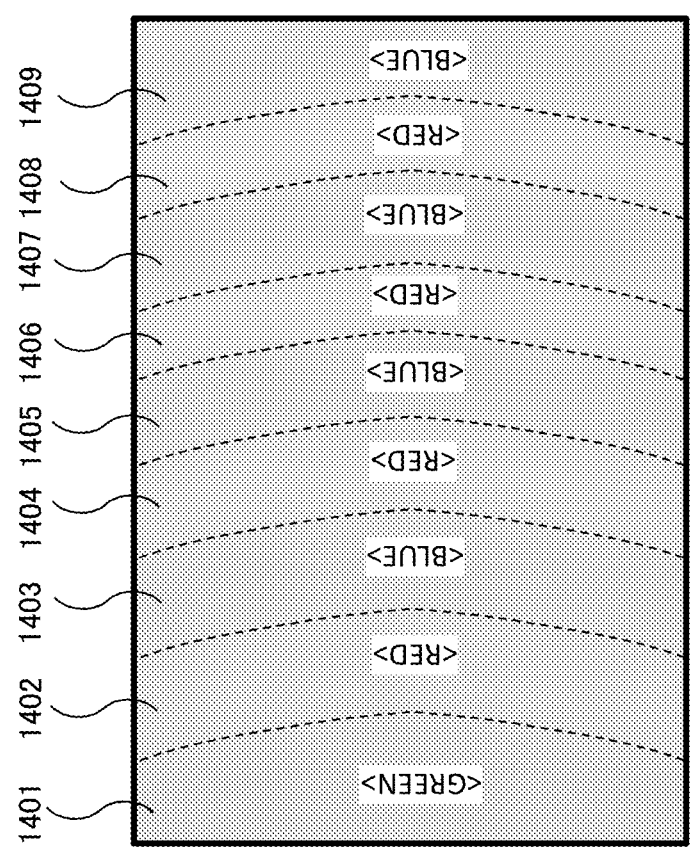
FIG. 14 is a view illustrating an example of a visually-recognized image before image quality correction.

FIG. 14 is a view illustrating an example of a visually-recognized image before the image quality correction. This is an image visually recognized by using the light-guiding plate 200 when the entire white (the entire-surface uniform) image is displayed by the image projection unit 103, and the number of multiple-recordings is M=20. In this case, the image is divided into approximately nine regions 1401 to 1409 with the brightness and the color being different (the regions are lightly colored in red, green, and blue). The image quality correction unit 102 corrects the incident image so as to allow the brightness unevenness and the color unevenness to be substantially uniform, but the image correction involves, for example, a change in gradation and frame rate. In addition, correction may be performed with respect to deterioration including other image quality deterioration, for example, deterioration of the spatial light modulator in the projector, deterioration of other optical systems, deterioration of temporal change of the light-guiding plate, and the like.

Furthermore, the image quality correction unit 102 may not only correct the color and the brightness but also adjust the display position and the angle of each image displayed on both eyes of the user. Accordingly, it is possible to remove the feeling of fatigue and stress due to the fact that the left and right eyes see the images at different positions.

According to the light-guiding plate of the present embodiment, there is an effect that the light-guiding plate can be applied to the incident rays in a wide ray angular range and a wide wavelength range and that a decrease in optical efficiency can be suppressed as much as possible. Accordingly, the amount of outgoing light of the projector that emits image light to the light-guiding plate can be suppressed, and thus, this contributes to reduction in power consumption and reduction in size of the HMD.

Second Embodiment

In a second embodiment, a method of manufacturing the light-guiding plate (volume-type hologram) described in the first embodiment will be described.

Figure 15:
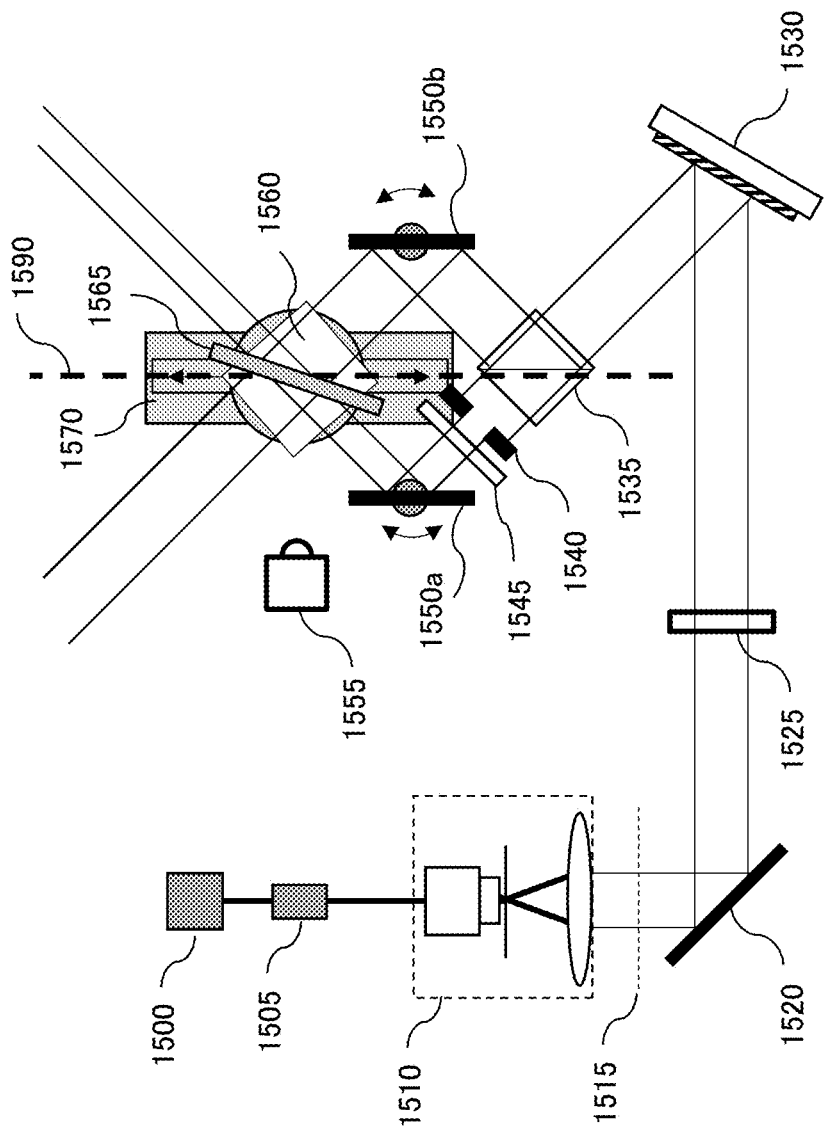
FIG. 15 is a schematic view illustrating an example of a volume-type hologram manufacturing apparatus (second embodiment).

FIG. 15 is a schematic view illustrating an example of a volume-type hologram manufacturing apparatus. The configuration and operation of the manufacturing apparatus will be described.

First, a light beam emitted from a light source 1500 having high space and time coherence, such as a laser, passes through a shutter 1505, is incident on a beam expander 1510, and expands a beam diameter. The beam expander 1510 is configured with an objective lens, a pinhole, and a collimator lens and serves as a spatial filter to remove high-frequency components of the beam cross-sectional intensity distribution 1515 and to realize a substantially uniform wavefront and intensity distribution. Next, the light is reflected by a mirror 1520 and converted into a desired polarization direction by a half-wave plate (HWP) 1525, and after that, is reflected by a spatial light modulator (SLM) 1530 to be incident on a polarizing beam splitter (PBS) 1535. In the PBS 1535, the beam is split into two beams at a spectral ratio of approximately 1:1.

One of the split beams (left side in the figure) passes through an aperture 1540 and an HWP 1545 to be changed in beam shape and polarization direction, is reflected by a rotating mirror 1550*a*, and is incident on a recording medium 1565. On the other hand, the other beam (right side in the figure) split by the PBS is reflected by a rotating mirror 1550*b* and is incident on the recording medium 1565. Both the two beams are S-polarized light perpendicular to the plane of the paper surface (incident surface) and interfere with each other in the recording medium 1565 to form interference fringes, and the interference fringes are recorded as holograms on the recording medium.

Herein, in order to perform recording on the recording medium 1565 by using a beam incident at an angle of generating total reflection, the recording medium 1565 is coupled by a coupling prism 1560 to allow the beam to be incident. The coupling prism 1560 has substantially the same refractive index as the recording medium 1565 and uses index matching oil or the like on the adhesive surface to prevent unnecessary reflection at the boundary with the recording medium. In addition, the two rotating mirrors 1550*a* and 1550*b* are controlled and rotated so as to have an angle that is inverted (folded) axis-symmetrically with respect to the center line 1590. The stage 1570 performs position control of the recording medium in one axial direction so that the recording medium always exists at the intersection point of the beams. Furthermore, an incoherent curing light source 1555 such as a light emitting diode (LED) is used for pre-curing and post-curing.

Figure 16:
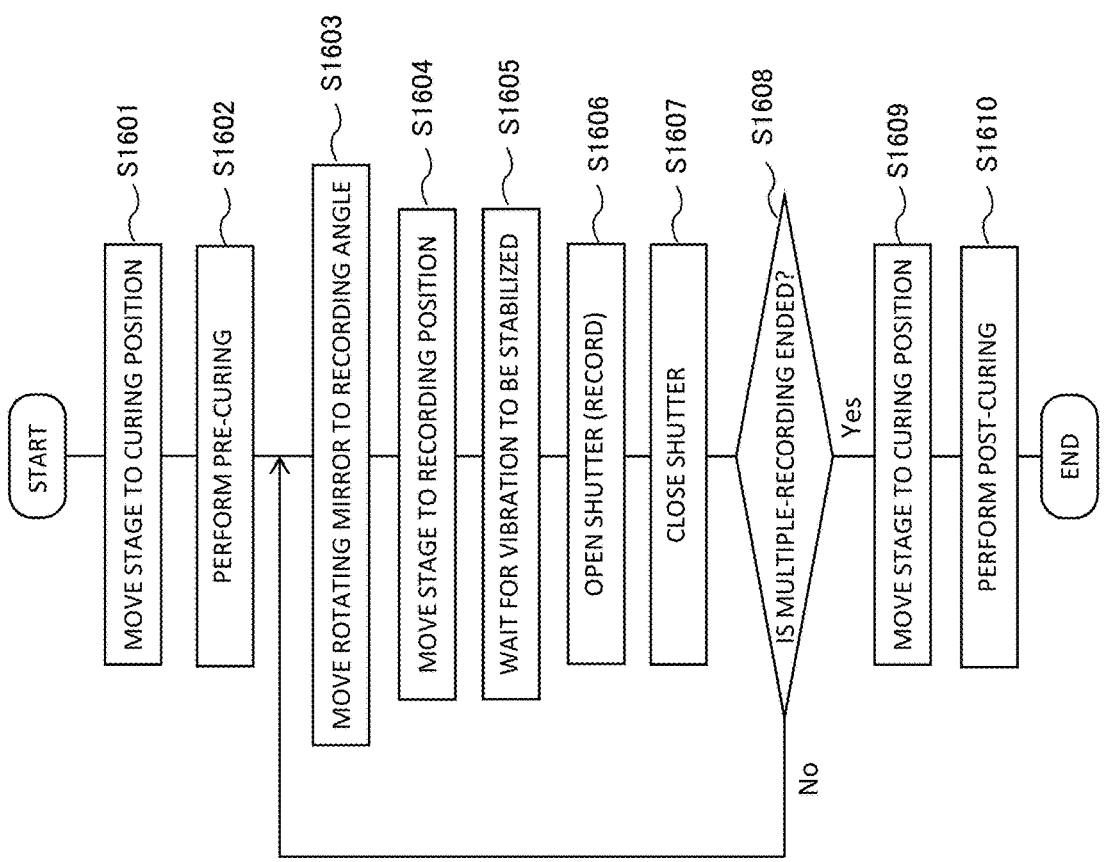
FIG. 16 is a flowchart illustrating a manufacturing process of a volume-type hologram.

FIG. 16 is a flowchart illustrating a manufacturing process of the volume-type hologram. First, when the coupling prism 1560 and the recording medium 1565 are set on the stage 1570, the stage is moved to the curing position (S1601), and pre-curing with the desired energy is performed by the LED light source (S1602). Next, the rotating mirrors 1550*a* and 1550*b* are moved and fixed at the recording angle (S1603), and substantially at the same time, the stage 1570 is moved to the position where the beams intersect (S1604). Next, after waiting for the vibration of the stage and the mirror to damp (S1605), the shutter 1505 is opened to start the recording of the hologram (S1606). When the desired exposure time has elapsed, the shutter 1505 is closed, the recording is ended (S1607). It is determined whether all the desired number M of multiple-recordings has been ended (S1608). If not ended, the process returns to S1603 to change the recording angle and performs the next recording. When the desired number M of multiple-recordings is completed, the stage 1570 is moved to the curing position (S1609), and post-curing is performed by the LED light source (S1610). The above is the operation flow of the basic hologram recording.

In addition to the above-described operation flow, for example, before recording or before exposure, by controlling and confirming so that the coherence, intensity, wavelength, and the like of the light source are stabilized, a high-quality hologram can be recorded. In addition, in a case where the refractive index of the recording medium is different from the refractive index of the prism, the substrate, or the like, by performing recording at a corrected angle, high-precision recording can be implemented. Furthermore, by setting the aperture 1540 as a rotating or variable opening, the beam diameter is appropriately controlled so that the two beam irradiation positions and areas on the recording medium surface are substantially the same. Accordingly, it is possible to avoid unnecessary exposure and to record a high-quality hologram free from the influence of stray light or the like.

A spatial modulator (SLM) 1530 is an element that can modulate the light intensity distribution and is configured with using liquid crystal, MEMS, or the like. This may be a simple mirror, but by modulating the intensity distribution by the SLM, the spatial distribution of the diffraction efficiency of the recorded hologram can be controlled, and thus, the image quality of the image visually recognized through the light-guiding plate can be improved. In addition, due to the characteristics of the light-guiding plate using total reflection, the efficiency of the light to be guided varies with the incident polarization and the incident angle, so that unevenness occurs in an image. Such influence can be corrected by the SLM 1530. In addition, the SLM 1530 can also correct a portion of the brightness unevenness and the color unevenness of the image illustrated in FIG. 14.

Figures 17A, 17B:
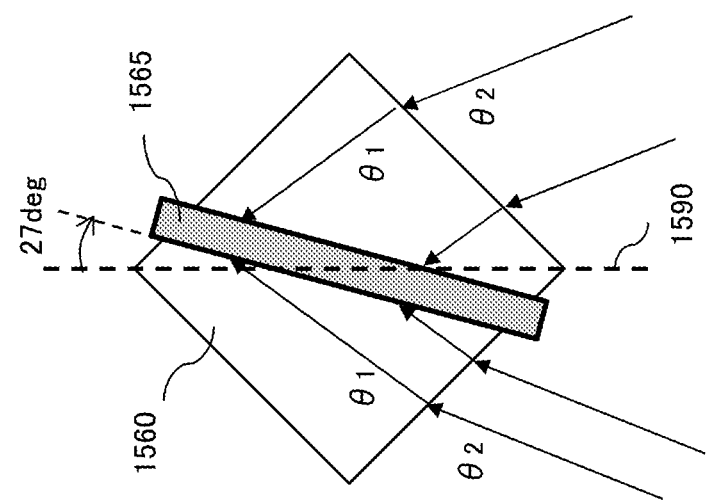
FIG. 17A is a view illustrating a specific example of a recording angle at the time of hologram multiple-recording.
FIG. 17B is a view illustrating a specific example of the recording angle at the time of hologram multiple-recording.

FIGS. 17A and 17B are views illustrating specific examples of the recording angle at the time of the hologram multiple-recording. FIG. 17A is a view describing the definition of an angle. The recording medium 1565 is provided to be inclined by 27 degrees with respect to the coupling prism 1560, and the interference fringes are formed parallel to the center line 1590 in FIG. 15, so that the angle between the interference fringes and the recording medium 1565 becomes 27 degrees. FIG. 17B illustrates the values of the recording angles in a table. Herein, multiple-recording of M=27 is performed, and the recording angular space is 1 degree in the recording medium. This is a very large value as compared with, for example, the recording angular space of 0.2 degrees in Patent Document 2. Since there is a change of ±13 degrees in the recording medium, the change is approximately ±20 degrees due to the refraction in the air. For the reason, the rotating mirror is rotated by about ±10 degrees.

According to the manufacturing method of the present embodiment, the number of hologram multiple-recordings is greatly reduced as compared with the related art, and the recording angular space is large, so that a desired light-guiding plate can be easily and simply manufactured.

Third Embodiment

In the third embodiment, a polarizing plate is attached to the outside of the light-guiding plate of the first embodiment so as to display a high-quality image.

FIG. 18 is a view illustrating the configuration of the light-guiding plate according to the third embodiment. The polarizing plate 1705 is attached to the outside of the light-guiding plate 200. For example, the polarizing plate 1705 transmits the P-polarized light and cuts the S-polarized light. On the other hand, since the light-guiding plate 200 can display an image with high image quality by using the total reflection condition by passing only the S-polarized light, the polarization direction of the light from the outside world and the polarization direction of the light from the light-guiding plate 200 can be allowed to be substantially perpendicular to each other. Accordingly, it is possible to remove crosstalk caused by diffracting the light of the outside world by the hologram. This is because a hologram generally has a high diffraction efficiency with respect to S-polarized light, and thus external light having only P-polarized light is less likely to be influenced by such light. In addition, since the transmittance of the external light is reduced, an effect similar to sunglasses is generated, and the light from the light-guiding plate 200 is felt relatively bright, so that the visibility of the displayed image is improved. In addition, it is possible to improve the visibility with low power consumption.

Fourth Embodiment

In the fourth embodiment, a high-quality image is visually recognized by using the hologram structure or the X-grating structure in the eye-box enlargement unit of the light-guiding plate of the first embodiment.

FIGS. 19A to 19D are schematic views illustrating a configuration of the light-guiding plate according to the fourth embodiment. A hologram structure 1920 is buried in an eye-box enlargement unit 1915 of the light-guiding plate.

Figure 19A:
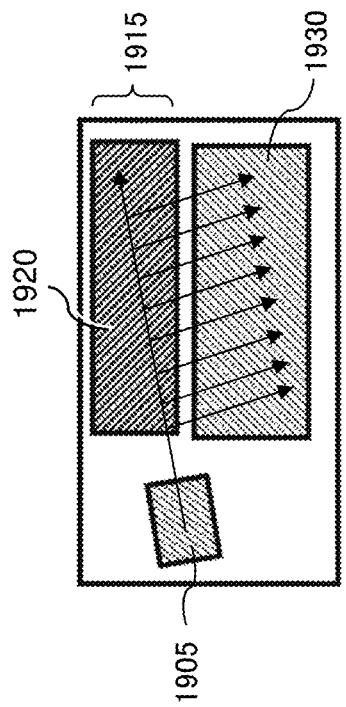
FIG. 19A is a schematic view illustrating a configuration of a light-guiding plate according to a fourth embodiment.

FIG. 19A illustrates that the ray group 1910 emitted from the image projection unit is incident on the incident coupler 1905, and the ray group is duplicated by the eye-box enlargement unit 1915. Herein, the hologram structure 1920 is buried below the mirror surface 1935 above the eye-box enlargement unit 1915, and thus, the same effect as the beam splitter is obtained, and the ray group is duplicated. The hologram structure 1920 is configured with a volume-type hologram and has a role similar to a beam splitter parallel to the mirror surface, so that a portion of the light is transmitted, and the remaining light is reflected. A method of forming a volume-type hologram can be realized by applying the method described above with reference to FIGS. 15 and 16. In addition, since the spatial distribution of diffraction efficiency can be controlled by modulating the intensity distribution of light at the time of recording by the SLM, the beam splitter with a controlled reflectance can be realized by the volume-type hologram.

The ray group 1925 duplicated by the eye-box enlargement unit 1915 is emitted to the outside of the light-guiding plate by the outgoing coupler 1930. Herein, when the user visually recognizes the image, a high-quality image display can be realized by controlling the diffraction efficiency (reflectance) of the hologram structure 1920 so that the color unevenness and the brightness unevenness of the image are reduced. Herein, a beam splitter structure may be provided below the eye-box enlargement unit 1915, and thus, an optimal reflectance distribution can be realized together with the hologram structure 1920. In addition, since the beam splitter realized with the hologram structure has a continuous reflecting surface, the ray group is continuously duplicated, so that there is a possibility that an image with high image quality can be visually recognized.

Figure 19B:
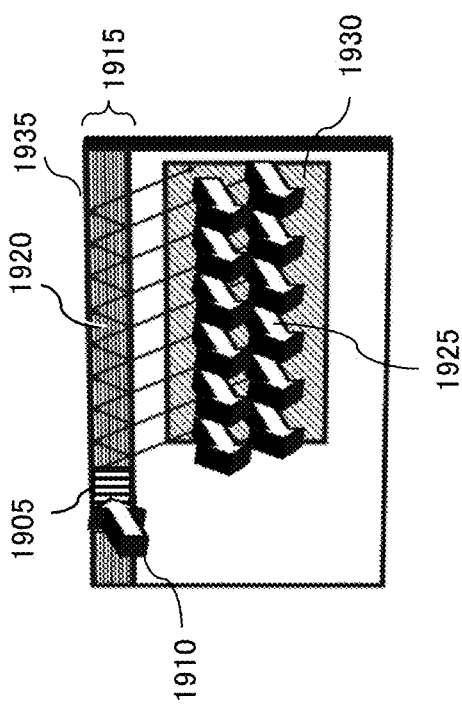
FIG. 19B is a schematic view illustrating the configuration of the light-guiding plate according to the fourth embodiment.

FIG. 19B illustrates another configuration example, in which the eye-box enlargement unit 1915 has no mirror surface and which is entirely configured with the hologram structure 1920. Accordingly, there is no need to form a mirror surface, and thus, it facilitates manufacturing. In addition, the hologram structure 1920 of the eye-box enlargement unit 1915 and the outgoing coupler 1930 may be multiple-recorded to be recorded at the same location.

Figure 19D:
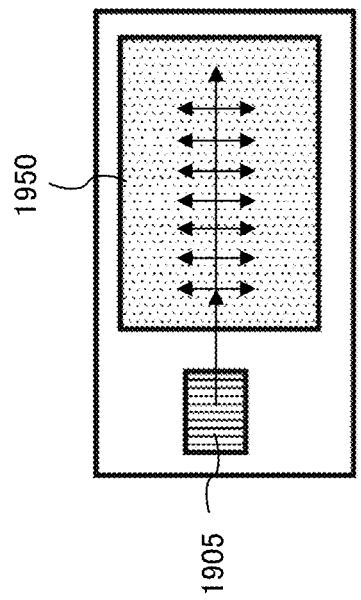
FIG. 19D is a schematic view illustrating the configuration of the light-guiding plate according to the fourth embodiment.
Figure 19C:
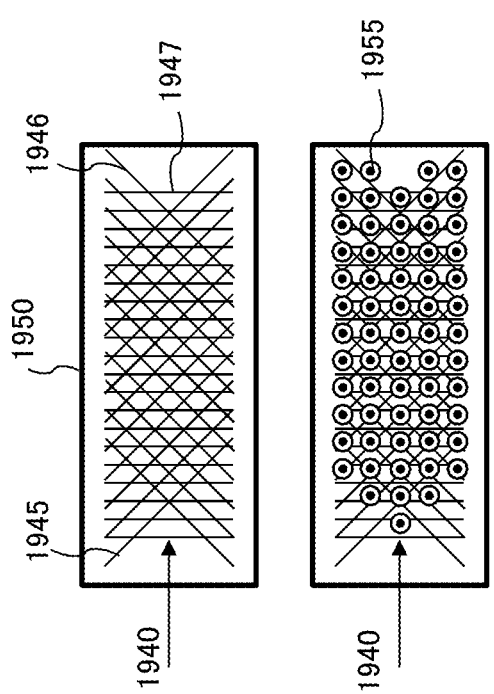
FIG. 19C is a schematic view illustrating the configuration of the light-guiding plate according to the fourth embodiment.

FIG. 19C illustrates a structure called X-grating in the embodiment. In FIGS. 19A and 19B, the hologram structure 1920 has the same role as a single beam splitter, whereas the X-grating has a hologram structure in which a plurality of beam splitters have the same role. As an example, an X-grating serving as three beam splitters will be described. Three hologram structures 1945, 1946, and 1947 are multiple-recorded in the X-grating 1950, and if the incident light 1940 is incident on the X-grating by the total reflection light guiding, the ray group is emitted to the outside of the light-guiding plate by the hologram structure 1947, and in addition, the ray group is duplicated in the vertical direction by the hologram structures 1945 and 1946.

FIG. 19D illustrates a light-guiding plate using X-grating 1950. The ray group incident on the incident coupler 1905 is guided inside the light-guiding plate by total reflection, and when the ray group is incident on the X-grating 1950, the ray group is duplicated two-dimensionally and emitted. Accordingly, the outgoing light 1955 is duplicated two-dimensionally and emitted to obtain an eye-box enlarging effect, and one X-grating can serve as both an eye-box enlarging and an outgoing coupler, so that it is possible to implement reduction in size of elements.

Heretofore, the embodiments of the present invention have been described above. In the method of the related art, multiple-recording is performed so that Bragg selectivity substantially overlaps, and thus, the number of multiple-recordings is increased to about 200, so that the optical efficiency is reduced. According to the present invention, by reducing the number of multiple-recordings and determining the optimum number, it is possible to suppress a decrease in optical efficiency.

Each of the above-described embodiments has been described in detail in order to describe the present invention for the easy understanding, and the embodiments are not necessarily limited to those having all the configurations described above. In addition, a portion of the configurations of one embodiment can be replaced with the configurations of another embodiment, and the configurations of one embodiment can be added to the configurations of another embodiment. In addition, for a portion of the configuration of each embodiment, it is possible to add, delete, or replace other configurations.

REFERENCE SIGNS LIST

100 Video display device (HMD)
101 Image input unit
102 Image quality correction unit
103 Image projection unit (including light source)
104 Image display unit
200 Light-guiding plate
201 Incident coupler
202 Eye-box enlargement unit
203 Outgoing coupler
220 Ray group
221 Center ray
310 Peripheral ray
320*a*, 320*b* Light-guiding surface
330 Mirror surface
340 Beam splitter surface
410 Prism
505, 1210 Incident ray
510, 1220 Outgoing ray
1200 Volume-type hologram (light diffracting portion)

The invention claimed is:

1. A light-guiding plate comprising:
a light diffracting portion diffracting incident light by a multiple-recorded hologram,
wherein, in the light diffracting portion, when light of a single wavelength having a certain angular range is incident, at least two or more outgoing rays are discretely emitted with a first angular space $\theta s$, and the emitted rays each have a second angular range $\theta a$, and the first angular space $\theta s$ is equal to or larger than the second angular range $\theta a$, and
wherein the angular relationship satisfies $\theta s > k\theta a$ (k is a real number of 3 or more).

2. The light-guiding plate according to claim 1, wherein the light diffracting portion is used as an outgoing coupler converting light propagating in the light-guiding plate to light emitted to an outside of the light-guiding plate.

3. The light-guiding plate according to claim 2, wherein the light diffracting portion is further used as an incident coupler converting light incident from the outside of the light-guiding plate to light propagating in the light-guiding plate.

4. The light-guiding plate according to claim 3, wherein the grating vector group of the light diffracting portion in the incident coupler and the outgoing coupler is configured to be inverted axis-symmetrically with respect to the surface of the light-guiding plate.

5. The light-guiding plate according to claim 2, further comprising an eye-box enlargement unit duplicating a ray propagating in the light-guiding plate and emitting the duplicated ray to the outgoing coupler.

6. The light-guiding plate according to claim 5, wherein the eye-box enlargement unit includes a mirror surface or a beam splitter surface.

7. The light-guiding plate according to claim 6, wherein the beam splitter surface has uniform transmittance.

8. The light-guiding plate according to claim 6, wherein the beam splitter surface has uneven transmittance.

9. The light-guiding plate according to claim 5, wherein the eye-box enlargement unit is configured with a mirror surface and a beam splitter surface provided in parallel to the mirror surface.

10. The light-guiding plate according to claim 9, wherein an incident coupler being disposed between the mirror surface and the beam splitter surface, and converting the light incident from the outside of the light-guiding plate to the light propagating in the light-guiding plate.

11. The light-guiding plate according to claim 1, wherein the single wavelength is a wavelength of light used for recording the hologram or a wavelength of light used for reproducing the hologram.

12. A video display device displaying an image emitted from an image projection unit to eyes of a user through a light-guiding plate,
wherein the image projection unit uses a light emitting diode (LED) light source that is pseudo white light,
wherein the light-guiding plate has a light diffracting portion diffracting incident light by multiple-recorded holograms,
wherein, in the light diffracting portion, when light of a single wavelength having a certain angular range is incident, at least two or more outgoing rays are discretely emitted with a first angular space $\theta s$, and the emitted rays each have a second angular range $\theta a$, and the first angular space $\theta s$ is equal to or larger than the second angular range $\theta a$, and wherein the angular relationship satisfies $\theta s > k\theta a$ (k is a real number of 3 or more).

13. The video display device according to claim 12, further comprising:

an image quality correction unit correcting an image quality of an image to be displayed, wherein the image quality correction unit equalizes color unevenness and brightness unevenness of an image generated by the light diffracting portion included in the light-guiding plate.

\* \* \* \* \*